United States Patent [19]

Itoh

[11] Patent Number: 6,108,132
[45] Date of Patent: *Aug. 22, 2000

[54] POLARIZED LIGHT SEPARATING/ COMBINING OPTICAL ELEMENT, POLARIZED LIGHT ILLUMINATING APPARATUS AND PROJECTION-TYPE DISPLAY DEVICE

[75] Inventor: Yoshitaka Itoh, Suwa, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/051,633

[22] PCT Filed: Aug. 20, 1997

[86] PCT No.: PCT/JP97/02874

§ 371 Date: Apr. 16, 1998

§ 102(e) Date: Apr. 16, 1998

[87] PCT Pub. No.: WO98/08118

PCT Pub. Date: Feb. 26, 1998

[30] Foreign Application Priority Data

Aug. 20, 1996 [JP] Japan .................... 8-238464

[51] Int. Cl.$^7$ .................................. G02B 5/30
[52] U.S. Cl. .................. 359/487; 359/494; 359/495
[58] Field of Search ................... 359/483, 485, 359/487, 495, 496, 497; 353/20; 349/9

[56] References Cited

U.S. PATENT DOCUMENTS 5,295,018  3/1994  Konuma et al. .................. 359/487
5,485,310  1/1996  Inada .................................. 359/495

FOREIGN PATENT DOCUMENTS

| 3-191318 | 8/1991 | Japan . |
|---|---|---|
| 5-27201 | 2/1993 | Japan . |
| 5-34638 | 2/1993 | Japan . |
| 6-202041 | 7/1994 | Japan . |
| 6-208080 | 7/1994 | Japan . |
| 7-244282 | 9/1995 | Japan . |
| WO96/20422 | 7/1996 | WIPO . |

OTHER PUBLICATIONS

Patent Abstracts Of Japan, "Lighting Device and Projection Display Device Using It", JP–A–08–211 329, Aug. 20, 1996.

Patent Abstracts Of Japan, "Polarizing Illuminator and Projection Type Display Device Using The Same", JP–A–08–220 475, Aug. 30, 1996.

*Primary Examiner*—Cassandra Spyrou
*Assistant Examiner*—E. Cherry
*Attorney, Agent, or Firm*—Oliff & Berridge, PLC

[57] ABSTRACT

In a polarization illuminating device 1, random polarized light emitted from first and second light source sections 101*x* and 101*z* is separated into two types of polarized light by a polarization separation section 202, and then secondary light source images deviated in the x-direction are formed, with the directions of polarization being aligned. First through third converging mirror plates 1001*x*, 1002 and 1001*z* are obliquely arranged so that, in the light emitted from the first and second light source sections 101*x* and 101*z*, the secondary light source images due to the S-polarized light may be superimposed one upon the other, and the secondary light source images due to the P-polarized light may be superimposed one upon the other. Thus, a polarization illuminating device capable of utilizing both polarization components is provided without entailing an increase in the area of the light source image although a plurality of light sources are used. Further, it is possible to provide a projection display device capable of projecting a very bright projection image.

12 Claims, 20 Drawing Sheets

(A) EMISSION SPECTRUM EXAMPLE OF FIRST LIGHT SOURCE SECTION (B) EMISSION SPECTRUM EXAMPLE OF SECOND LIGHT SOURCE SECTION (C) EMISSION SPECTRUM EXAMPLE OF POLARIZATION ILLUMINATING DEVICE 1

POLARIZED LIGHT SEPARATING/COMBINING OPTICAL ELEMENT, POLARIZED LIGHT ILLUMINATING APPARATUS AND PROJECTION-TYPE DISPLAY DEVICE

BACKGROUND OF THE INVENTION

1. Field of the Invention

The present invention relates to a polarization illuminating device for uniformly illuminating a rectangular illumination region or the like by using polarized lights whose directions of polarization are aligned, and to a projection type display device using this polarization illuminating device. More specifically, the present invention relates to a structure for synthesizing lights emitted from two light source sections while aligning the directions of polarization thereof.

2. Description of Related Art

In a liquid crystal display device using a modulator of a type which modulates a particular polarized light like a liquid crystal element, only one of two polarization components emitted from the light source can be utilized. Thus, to obtain a bright projection image, it is necessary to enhance the efficiency in the utilization of light. However, there is a limitation in enhancing the efficiency in the utilization of light in a projection type display device using only one light source. Thus, using a plurality of light sources to augment the quantity of light is a means for obtaining a bright projection image.

However, simply arranging a plurality of light sources only results in the area of the light source images being correspondingly augmented, and the quantity of light per fixed area is the same as when only one light source is used. Thus, in this case, there is substantially no increase in quantity of light per fixed area even though a plurality of light sources are used.

Even when the quantity of light is augmented by using a plurality of light sources, if only one of the two polarization components of the light emitted from the light source can be utilized, the rest of the quantity of light is wasted, and half the effectiveness is lost.

SUMMARY OF THE INVENTION

It is an object of the present invention to provide a polarization illuminating device in which a plurality of light sources are used without enlarging the area of the light source image, which makes it possible to utilize both polarization components and which makes it possible to project a very bright projection image.

The optical element of the present invention is an optical element substantially formed as a hexahedron and comprises a first polarization separation layer for separating light impinging upon a first surface of the hexahedron into first and second polarized lights whose planes of polarization are orthogonal to each other and outputting the first polarized light toward a third surface of the hexahedron and the second polarized light toward a fourth surface of the hexahedron, and a second polarization separation layer for separating light impinging upon a second surface of the hexahedron into the first and second polarized lights and outputting the second polarized light toward the fourth surface of the hexahedron and the first polarized light toward a fifth surface of the hexahedron.

By adopting the optical element of the present invention as the polarization separation/synthesis optical element of a polarization illuminating device as described below, the above problem can be solved.

The polarization illuminating device of the present invention comprises: a polarization separation/synthesis optical element equipped with two polarization separation layers and formed substantially as a hexahedron; first and second light source sections respectively arranged on the first and second surface sides of the polarization separation/synthesis optical element; a first converging reflection optical element arranged on a third surface side of the polarization separation/synthesis optical element and equipped with a plurality of converging reflection elements each adapted to substantially reverse the traveling direction of the incident light and form a convergent image; a second converging reflection optical element arranged on a fourth surface side of the polarization separation/synthesis optical element and equipped with a plurality of converging reflection elements each adapted to substantially reverse the traveling direction of the incident light and form a convergent image; a third converging reflection optical element arranged on a fifth surface side of the polarization separation/synthesis optical element and equipped with a plurality of converging reflection elements each adapted to substantially reverse the traveling direction of the incident light and form a convergent image; a first $\lambda/4$ phase difference plate arranged between the third surface of the polarization separation/synthesis optical element and the first converging reflection optical element; a second $\lambda/4$ phase difference plate arranged between the fourth surface of the polarization separation/synthesis optical element and the second converging reflection optical element; a third $\lambda/4$ phase difference plate arranged between the fifth surface of the polarization separation/synthesis optical element and the third converging reflection optical element; and a polarization conversion optical element arranged on the sixth surface side of the polarization separation/synthesis optical element and adapted to align the direction of polarization of the light emitted from the polarization separation/synthesis optical element.

In the polarization illuminating device of the present invention, random polarized light emitted from the first and second light source sections arranged on the first and second surface sides of the polarization separation/synthesis optical means is separated into two kinds of polarized light, P-polarized light and S-polarized light, by the polarization separation/synthesis optical element. Then, each polarized light is separated into a plurality of intermediate luminous fluxes by the first, second and third converging reflection elements respectively arranged on the third, fourth and fifth surface sides of the polarization separation/synthesis optical element. Further, the direction of polarization of each intermediate luminous flux is aligned by the polarization conversion optical element arranged on the sixth surface side of the polarization separation/synthesis optical element. Thus, although two light source sections are used, the illuminated area can be an illumination area substantially corresponding to a single light source. As a result, the quantity of light per fixed area can be twice as large as that in the case of a single light source, so that the illumination region can be illuminated with much brightness. Further, when the intermediate luminous fluxes obtained through separation by each converging reflection optical element are superimposed one upon the other at one illumination region, it is possible to uniformly illuminate the illumination region. Thus, by using the polarization illumination device of the present invention as the light source of the display device, it is possible to obtain an exceptionally uniform image. Further, in the polarization illuminating device of the present invention, the random polarized light emitted from the first and second light source sections can be synthesized into P-polarized light or S-polarized light without involving any loss. Thus, when the polarization illuminating device of the present invention is adopted in a display device using a modulation element of the type which modulates a particular polarized light like a liquid crystal element, it is possible to obtain a very bright image.

In the polarization illuminating device of the present invention, when the first converging reflection optical element is arranged so as not to be orthogonal to an axis orthogonal to the third surface of the polarization separation/synthesis optical element, the second converging reflection optical element is arranged so as not to be orthogonal to an axis orthogonal to the fourth surface of the polarization separation/synthesis optical element, and the third converging reflection optical element is arranged so as not to be orthogonal to an axis orthogonal to the fifth surface of the polarization separation/synthesis optical element, it is possible to form, with a simple structure, secondary light source images due to the P-polarized light and the S-polarized light formed by each converging reflection optical element at different predetermined positions.

In the polarization illuminating device of the present invention, when an angle variation prism is provided at least between the first converging reflection optical element and the third surface of the polarization separation/synthesis optical element, between the second converging reflection optical element and the fourth surface of the polarization separation/synthesis optical element, or between the third converging reflection optical element and the fifth surface of the polarization separation/synthesis optical element, it is possible to arrange the first through third converging reflection optical elements parallel to the surface of the polarization separation/synthesis optical element, so that these converging reflection optical elements can be easily installed. Further, by integrating the angle variation prism with the surface of the polarization separation/synthesis element through adhesion or by integrating the angle variation prism with the converging reflection optical element through adhesion, it is possible to reduce the reflection loss of light in the interface or reduce the size of the optical system.

Further, in the polarization illuminating device of the present invention, when an optical path changing optical element for changing the traveling direction of the polarization luminous flux emitted from the polarization conversion optical element is provided on the output side of the polarization conversion optical element, it is possible to obtain a compact device when this polarization illuminating device is used as the light source of a projection type display device or the like. In particular, by arranging the optical path changing element such that illumination light can be emitted in a direction parallel to the plane defined by the optical axes of the two relatively large light source sections, it is possible to reduce the thickness in one direction of the polarization illuminating device, thereby realizing a thin polarization illuminating device.

In the above polarization illuminating device, the converging reflection elements of the first, second and third converging reflection optical elements can be formed by curved surface mirrors. The converging reflection elements of the first, second and third converging reflection optical elements can also be formed by lenses and reflection surfaces provided on the sides of the lenses opposite to the polarization separation/synthesis elements.

The polarization illuminating device of the present invention can be used in a projection type display device including an optical modulator for modulating light emitted from the polarization illuminating device to form an image and a projection optical system for projecting the image formed by the optical modulator.

Further, the polarization illuminating device of the present invention can also be used in a projection type display device for displaying color images including a color light separation optical element for separating light emitted from the polarization illuminating device into a plurality of color lights, a plurality of optical modulators for modulating the color lights obtained through separation by the color light separation means to form images, and color light synthesizing means for synthesizing the images formed by the plurality of optical modulators, and a projection optical system for projecting the image synthesized by the color light synthesizing optical element.

By thus forming a projection type display device using the polarization illuminating device of the present invention, it is possible to obtain a projection image of uniform brightness. Since the polarization illuminating device of the present invention emits luminous fluxes whose directions of polarization are aligned, it is suitable for use in a projection type display device using a liquid crystal element as the optical modulator.

In the above projection type display device, it is desirable for at least one of the first and second light source sections to be constructed so as to be detachable. By thus constructing it, it is possible to detach one of the light source sections when carrying the projection type display device, thereby achieving an improvement in terms of portability.

Further, in the above projection type display device, it is desirable for at least one of the first and second light source sections to be capable of being selectively lighted. By thus constructing it, it is possible to selectively light only one light source when, for example, battery-driving the projection type display device, thereby elongating the service life of the battery. Further, when observing the projection image in a place where the surrounding region is bright, two light source sections are lighted, and when observing the projection image in a place where the surrounding region is dark, only one light source section is selectively lighted, whereby it is possible to appropriately vary the brightness of the projection image in accordance with the environment.

Further, in the above projection type display device, it is possible for the lights emitted from the first and second light source sections to have different spectral characteristics. This arrangement makes it possible for the color tone of the illumination light to be easily set to a predetermined color tone.

DETAILED DESCRIPTION OF THE PREFERRED EMBODIMENT

Figure 1:
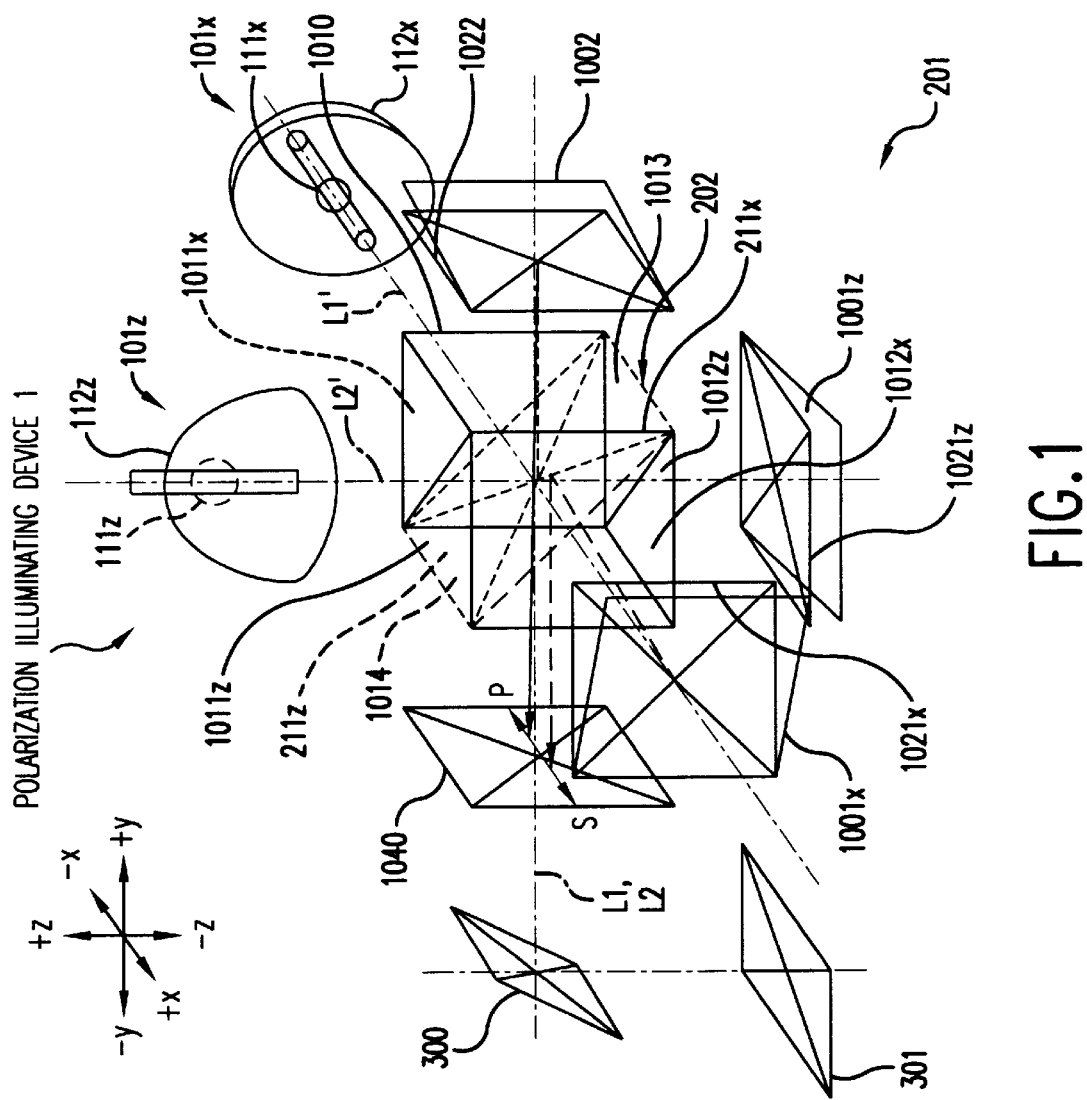
FIG. 1 an explanatory diagram illustrating a polarizing ion for light from a first light source section of a polarization illuminating device according to a first embodiment of the present invention.

Embodiments of the present invention will now be described with reference to the drawings.

In the description of the embodiments and the accompanying drawings, the components which are common to them are indicated by the same reference numerals and a description of such components will be omitted. Three spatial axes orthogonal to each other will be referred to as the x-axis, the y-axis and the z-axis. Two directions which are parallel to the x-axis will be referred to as the +x-direction and the −x-direction, two directions which are parallel to the y-axis will be referred to as the +y-direction and the −y-direction, and two directions which are parallel to the z-axis will be referred to as the +z-direction and the −z-direction.

[First Embodiment]

Figure 2:
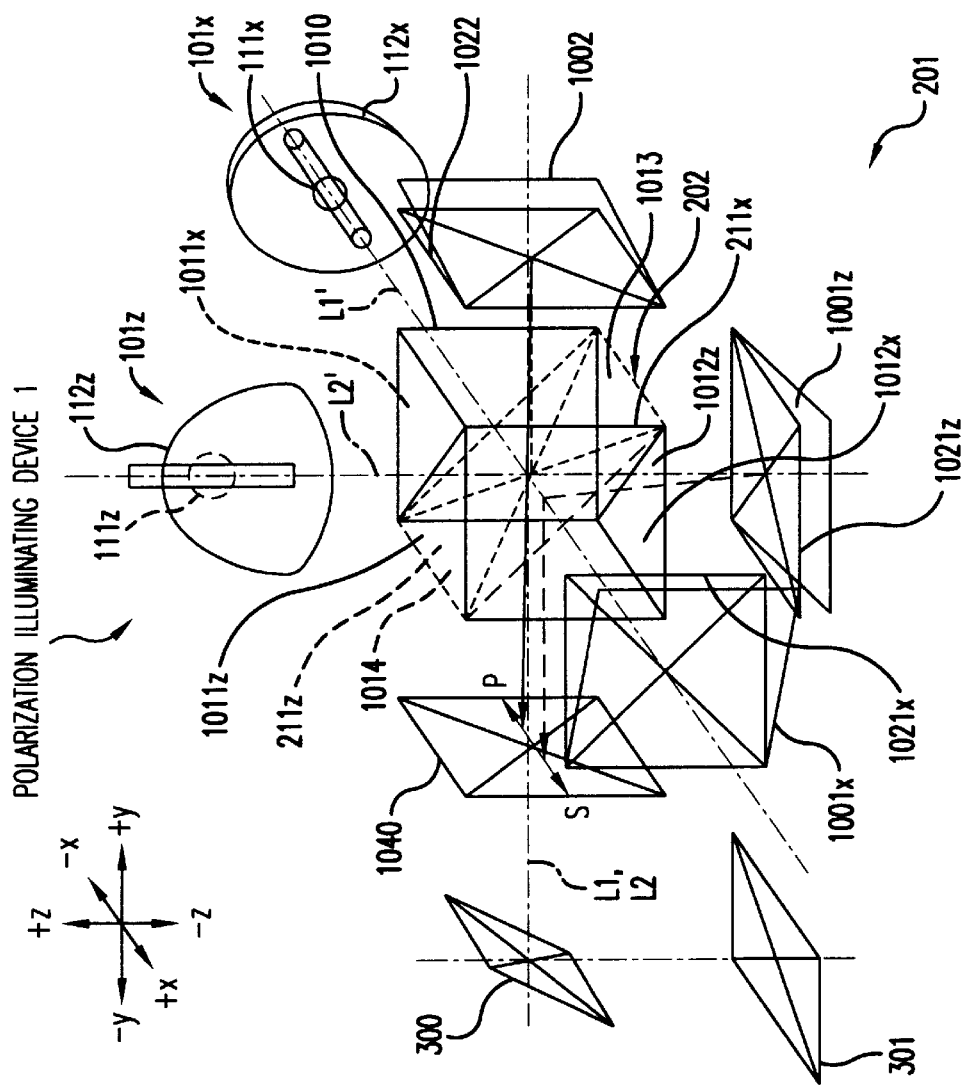
FIG. 2 is an explanatory diagram illustrating a polarizing operation for light from a second light source section of the polarization illuminating device according to the first embodiment of the present invention.

FIGS. 1 and 2 are perspective views showing a polarization illuminating device according to a first embodiment of the present invention. In this embodiment, two light source sections 101x and 101z emitting lights whose directions of polarization are random (hereinafter referred to as "random polarized light") are provided. Of these two light source sections, FIG. 1 shows how random polarized light emitted from the first light source section 101x is direction-separated along the x-axis in accordance with the direction of polarization thereof, and FIG. 2 shows how random polarized light emitted from the second light source section 101z is separated in the x-direction in accordance with the direction of polarization thereof.

As shown in FIGS. 1 and 2, a polarization illuminating device 1 according to this embodiment includes an integrator optical system 201 equipped with the first light source section 101x, a polarization separation section 202 (polarization separation/synthesis optical element), a first converging mirror plate 101x (first converging reflection optical element), a second converging mirror plate 1002 (second converging reflection optical element), and a converging lens section 1040 (polarization conversion optical element). The first light source section 101x, polarization separation section 202 and first converging mirror plate 1001x are disposed along optical system axis L1'. The second converging mirror plate 1002, polarization separation section 202 and converging lens section 1040 are disposed along system optical axis L1. System optical axes L1' and L1 are disposed at right angles with respect to each other in the xy-plane. As will be described below, a luminous flux emitted from the first light source section 101x is separated into two kinds of luminous flux in the polarization separation section 202, and then synthesized again into a single kind of polarization luminous flux by the first converging mirror plate 1001x, the second converging mirror plate 1002, the polarization separation section 202, and the converging lens section 1040 before reaching a rectangular illumination region 301.

Further, there are structures in which the integrator optical system 201 is arranged with the second light source section 101z, the polarization separation section 202, a third converging mirror plate 1001z (third converging reflection optical element), and the second converging mirror plate 1002, arranged along system optical axis L2', L2 bent at right angles in the yz-plane, and the converging lens section 1040. As will be described below, a luminous flux emitted from the second light source section 101z is separated into two kinds of luminous flux in the polarization separation section 202, and then synthesized again into a single kind of polarization luminous flux by the third converging mirror plate 1001z, the second converging mirror plate 1002, the polarization separation section 202, and the converging lens section 1040 before reaching the rectangular illumination region 301.

Between the converging lens section 1040 and the illumination region 301, a reflection mirror 300 (optical path changing optical element) for changing the traveling direction of the light emitted from the converging lens section 1040 is arranged. The light emitted from the converging lens section 1040 is reflected by this reflection mirror 300, and changes its traveling direction to a direction substantially parallel to the plane including the optical axis of the first light source section 101x and the optical axis of the second light source section 101z.

The first and second light source sections 101x and 101z are respectively generally comprises light source lamps 111x and 111z and paraboloidal reflectors 112x and 112z, and the polarized lights whose directions of polarization are random, emitted from the light source lamps 111x and 111z, are reflected in one direction by the paraboloidal reflectors 112x and 112z, respectively, and impinge upon the polarization separation section 202 as substantially parallel luminous fluxes. Instead of the paraboloidal reflectors 112x and 112z, it is also possible to use ellipsoidal reflectors, spherical reflectors, etc.

The polarization separation section 202 is a square-column-like polarization light splitter and comprises a glass prism 1010 containing first and second polarization separation layers 211x and 211z. The first polarization separation layer 211x is arranged obliquely with respect to the output light from the first light source section 101x, and formed so as to make an angle of α=45° with respect to the incident surface 1011x of the polarization separation section 202. The second polarization separation layer 211z is arranged obliquely with respect to the output light from the second light source section 101z, and formed so as to make an angle of α=45° with respect to the incident surface 1011z of the polarization separation section 202.

Figure 3:
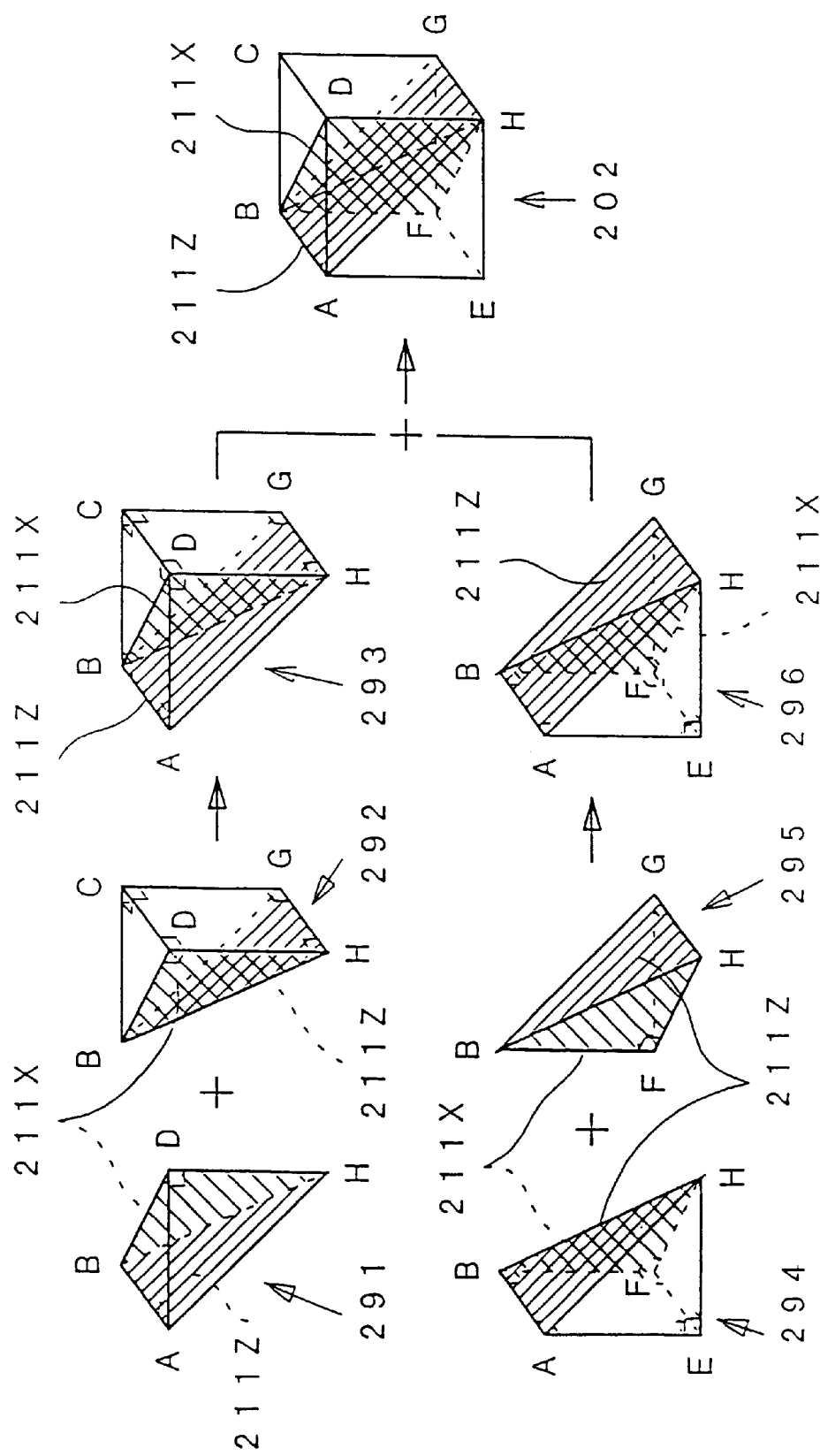
FIG. 3 is a diagram for illustrating the construction of a polarization separation section 202 in detail.

FIG. 3 is a diagram illustrating the construction of this polarization separation section 202 in detail. As shown in this drawing, the polarization separation section 202 comprises two triangular pyramid prisms 291 and 295 and two quadrangular pyramid prisms 292 and 294.

Between the side BDH of the first triangular pyramid prism 291 and the side BDH of the first quadrangular pyramid prism 292, and between the side BFH of the second quadrangular pyramid prism 294 and the side BFH of the second triangular pyramid prism 295, the polarization separation layer 211x is formed. This polarization separation layer 211x is formed by forming a dielectric multilayer film through evaporation, for example, on either the side BDH of the first triangular pyramid prism 291 or the side BDH of the first quadrangular pyramid prism 292, and on either the side BFH of the second quadrangular pyramid prism 294 or the side BFH of the second triangular pyramid prism 295. The surface on which the polarization separation layer 211x is formed may be either the side BDH of the first triangular pyramid prism 291 or the side BDH of the first quadrangular pyramid prism 292, and may be either the side BFH of the second triangular pyramid prism 295 or the side BFH of the second quadrangular pyramid prism 294. However, since it is desirable for the polarization separation layer 211x, formed on two prisms, to be flat, it is preferably formed on the side BDH of the first triangular pyramid prism 291 and the side BFH of the second quadrangular pyramid prism 294, or on the side BDH of the first quadrangular pyramid prism 292 and the side BFH of the second triangular pyramid prism 295.

On the other hand, the polarization separation layer 211z is formed between the side ABH of the first triangular pyramid prism 291 and the side ABH of the second quadrangular pyramid prism 294, and between the side BGH of the first quadrangular pyramid prism 292 and the side BGH of the second triangular pyramid prism 295. This polarization separation layer 211z is formed by forming a dielectric multilayer film through evaporation on either the side ABH of the first triangular pyramid prism 291 or the side ABH of the second quadrangular pyramid prism 294, and on either the side BGH of the first quadrangular pyramid prism 292 or the side BGH of the second triangular pyramid prism 295. The surface on which the polarization separation layer 211z is formed may either be the side ABH of the first triangular pyramid prism 291 or the side ABH of the second quadrangular pyramid prism 294, and either the side BGH of the first quadrangular pyramid prism 292 or the side BGH of the second triangular pyramid prism 295. However, since it is desirable for the polarization separation layer 211z formed on the two prisms to be flat, it is preferably formed on the side ABH of the first triangular pyramid prism 291 and the side BGH of the first quadrangular pyramid prism 292, or on the side ABH of the second quadrangular pyramid prism 294 and the side BGH of the second triangular pyramid prism 295.

Further, by gluing together the sides BDH of the first triangular pyramid prism 291 and the first quadrangular prism 292, on which the polarization separation layer 211x is formed, a first prism composite 293 is formed. Further, by gluing together the sides BFH of the second quadrangular pyramid prism 294 and the second triangular pyramid prism 295, on which the polarization separation layer 211x is formed, a second prism composite 296 is formed. Finally, by gluing together the sides ABGH of the two prism composites 293 and 296, on which the polarization separation layer 211z is formed, the polarization separation section 202 is completed.

Referring to FIGS. 1 and 2 again, a first λ/4 phase difference plate 1021x is formed on the exit surface 1012x of the polarization separation section 202, and a second λ/4 phase difference plate 1022 is formed on the exit surface 1013 thereof. Outside these phase difference plates, the first converging mirror plate 1001x and the second converging mirror plate 1002 are provided so as to be substantially directed to the center of the polarization separation section 202, and so as to cross the x-axis and the y-axis to make predetermined angles with respect to the yz-plane and the zx-plane. A third λ/4 phase difference plate 1021z is formed on the exit surface 1012z of the polarization separation section 202. On the outside of this phase difference plate, the third converging mirror plate 1001z is provided so as to be substantially directed to the center of the polarization separation section 202, and so as to cross the z-axis to make a predetermined angle with respect to the xy-plane. The structure of these converging mirror plates 1001x, 1002 and 1001z will be described in detail below.

On the exit surface 1014 side of the polarization separation section 202, a converging lens section 1040 composed of a converging lens plate 1041 and a λ/2 phase difference plate 1043 described in detail below is arranged perpendicular to the system optical axis L1 (L2).

Figure 4:
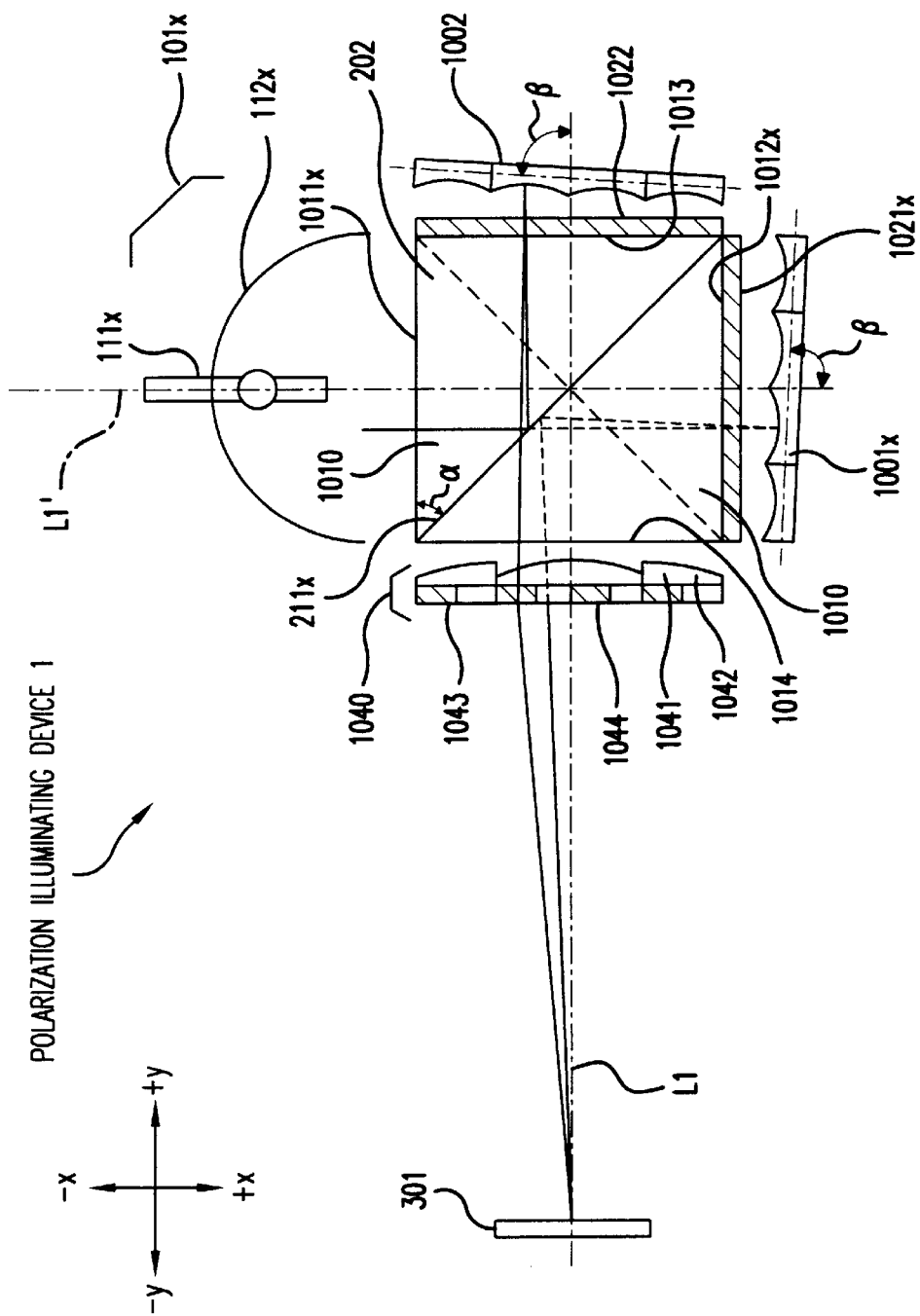
FIG. 4 is a schematic diagram showing the basic structure of an optical system formed in a polarization illuminating device according to the first embodiment of the present invention.

In the polarization illuminating device 1, constructed as described above, the process in which random polarized light emitted from the first light source section 101x is direction-separated along the x-axis in accordance with its direction of polarization will be first described with reference to FIGS. 1 and 4. FIG. 4 is sectional view taken along the xy-plane of FIG. 1. The reflection mirror 300 is omitted since it is not directly related to the explanation of the above process. The optical path from the converging lens section 1040 to the illumination region 301 is represented as a linear path. In this regard, it is the same with FIGS. 11 through 15 described below.

The random polarized light emitted from the first light source section 101x can be regarded as a mixed light consisting of P-polarized light and S-polarized light. The mixed light emitted from the first light source section 101x and impinging upon the incident surface 1011x of the polarization separation section 202 is separated into two kinds of polarized light, P-polarized light and S-polarized light, by the polarization separation layer 211x. That is, the P-polarized light contained in the random polarized light is transmitted through the polarization separation layer 211x and heads for the exit surface 1012x, while the S-polarized light is reflected by the polarization separation layer 211x and diverted toward the exit surface 1013 of the polarization separation section 202.

The two kinds of polarized light obtained by separation through the polarization separation section 202 are transmitted through the λ/4 phase difference plates 1021x and 1022 and reflected by the converging mirror plates 101x and 1002.

Figure 5:
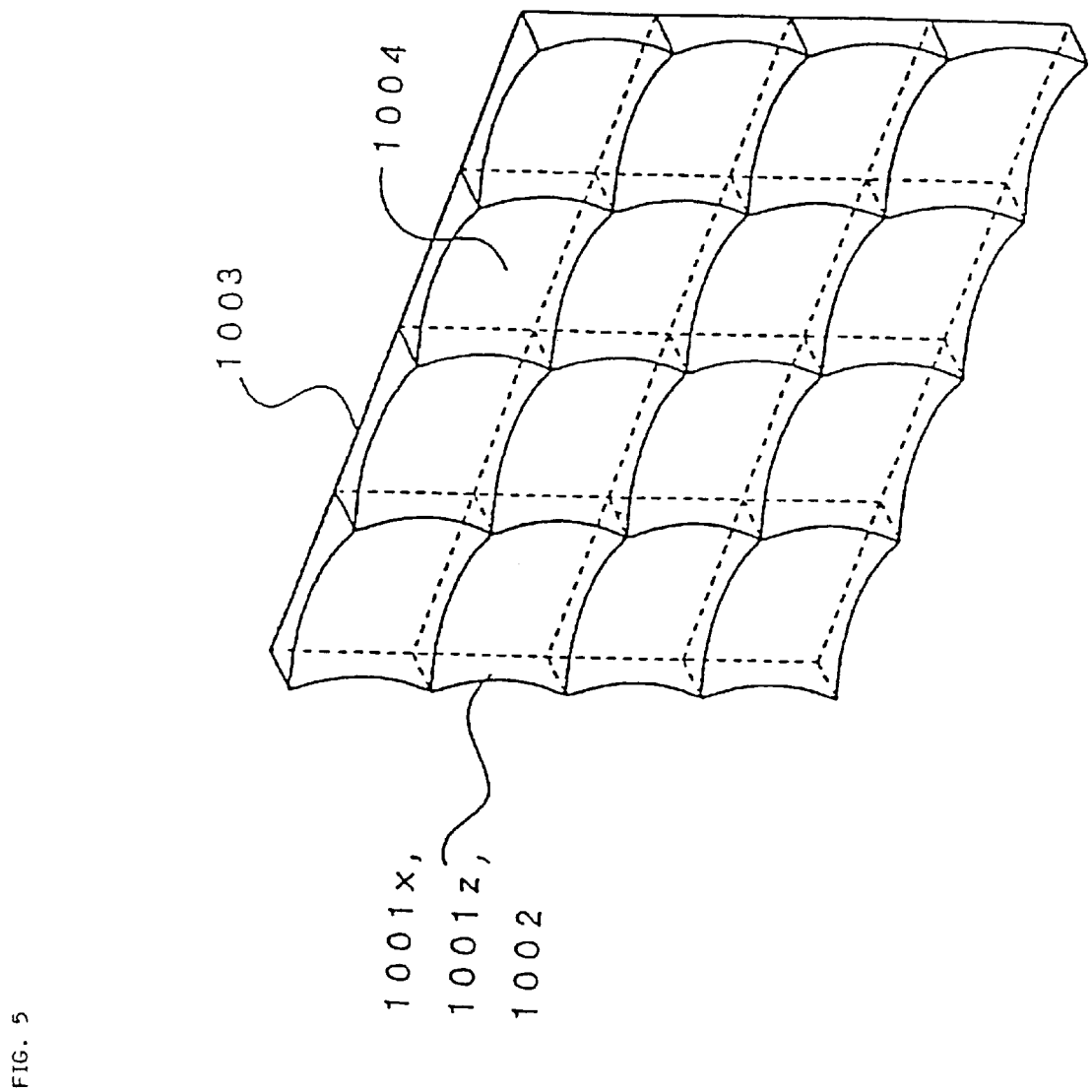
FIG. 5 is a perspective view of a converging mirror plate in the polarization illuminating device shown in FIG. 1.

As shown in the external view of FIG. 5, each of these converging mirror plates 1001x and 1002 is formed by arranging a plurality of uniform minute converging mirrors 1003 having a rectangular outer configuration, and forming thereon a reflecting surface 1004 made of an ordinary aluminum evaporation coating. In this embodiment, the reflecting surface 1004 of the minute converging mirrors 1003 is formed as a spherical surface. However, the curvature configuration of this reflecting surface 1004 may also be a paraboloidal, ellipsoidal or toric surface. It can be determined in accordance with the characteristics of the incident luminous fluxes from the light source sections 101x and 101z.

Figure 6:
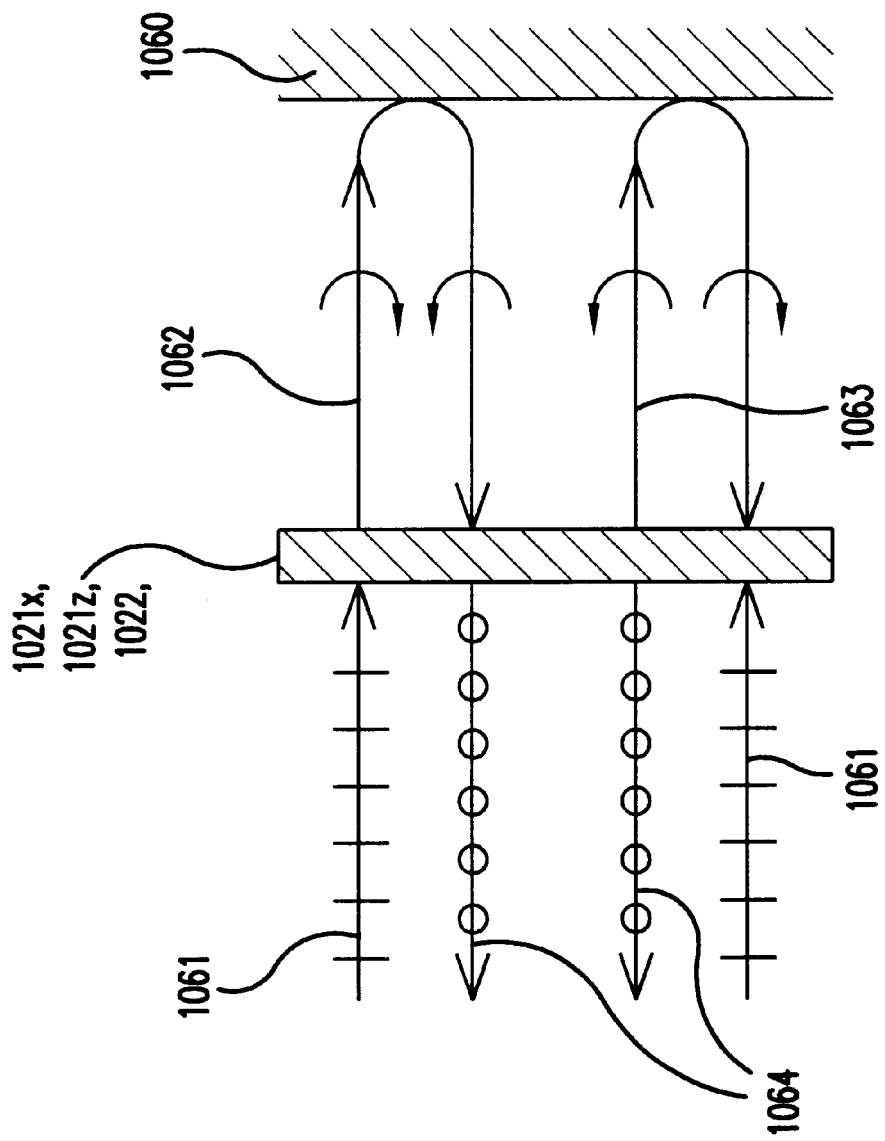
FIG. 6 is an explanatory diagram illustrating a polarizing operation in the polarization illuminating device shown in FIG. 1.

The P-polarized light and S-polarized light obtained through separation by the polarization separation layer 211x are respectively transmitted through the λ/4 phase difference plates 1021x and 1022 and reflected by the converging mirror plates 1001x and 1002, and, while passing through the λ/4 phase difference plates 1021x and 1022 again, the traveling direction of the polarized light is reversed substantially by 180° and, at the same time, the direction of polarization is rotated by 90°. The way the polarized light is changed will be described with reference to FIG. 6. In this drawing, the converging mirror plates 1001x and 1002 are depicted as flat mirror plates 1060 for the sake of simplicity. The P-polarized light 1061 impinging upon the λ/4 phase difference plate 1021x, 1021z is converted to a right-hand circularly polarized light (or a left-hand circularly polarized light according to the way the λ/4 phase difference plate is arranged) 1062 by the λ/4 phase difference plate 1021x, 1021z, and reaches the mirror plate 1060. The light is reflected by the mirror plate 1060 and, at the same time, the rotating direction of the polarization surface is changed. That is, the right-hand polarized light is changed to a left-hand polarized light (the left-hand polarized light is changed to a right-hand polarized light). The traveling direction of the light is reversed by the mirror plate 1060 by 180° and, at the same time, the polarized light which has become a left-hand circularly polarized light 1063 is converted to S-polarized light 1064 when it is transmitted through the λ/4 phase difference plate 1021x, 1021z again. By a similar process, the S-polarized light 1064 is converted to P-polarized light 1061.

Thus, the traveling direction of the P-polarized light which has reached the exit surface 1012x is reversed by substantially 180° by the λ/4 phase difference plate 1021x and the converging mirror plate 1001x and, at the same time, the P-polarized light is converted to S-polarized light and reversed by the polarization separation layer 211x to change its traveling direction before heading for the exit surface 1014. On the other hand, the traveling direction of the S-polarized light which has reached the exit surface 1013 is reversed by substantially 180° by the λ/4 phase difference plate 1022 and the converging mirror plate 1002, and the S-polarized light is converted to P-polarized light; it is transmitted through the polarization separation layer 211x and heads for the exit surface 1014. That is, the polarization separation layer 211x also acts as a polarization synthesis layer, so that the polarization separation section 202 functions as a polarization separation/synthesis means.

Figure 7:
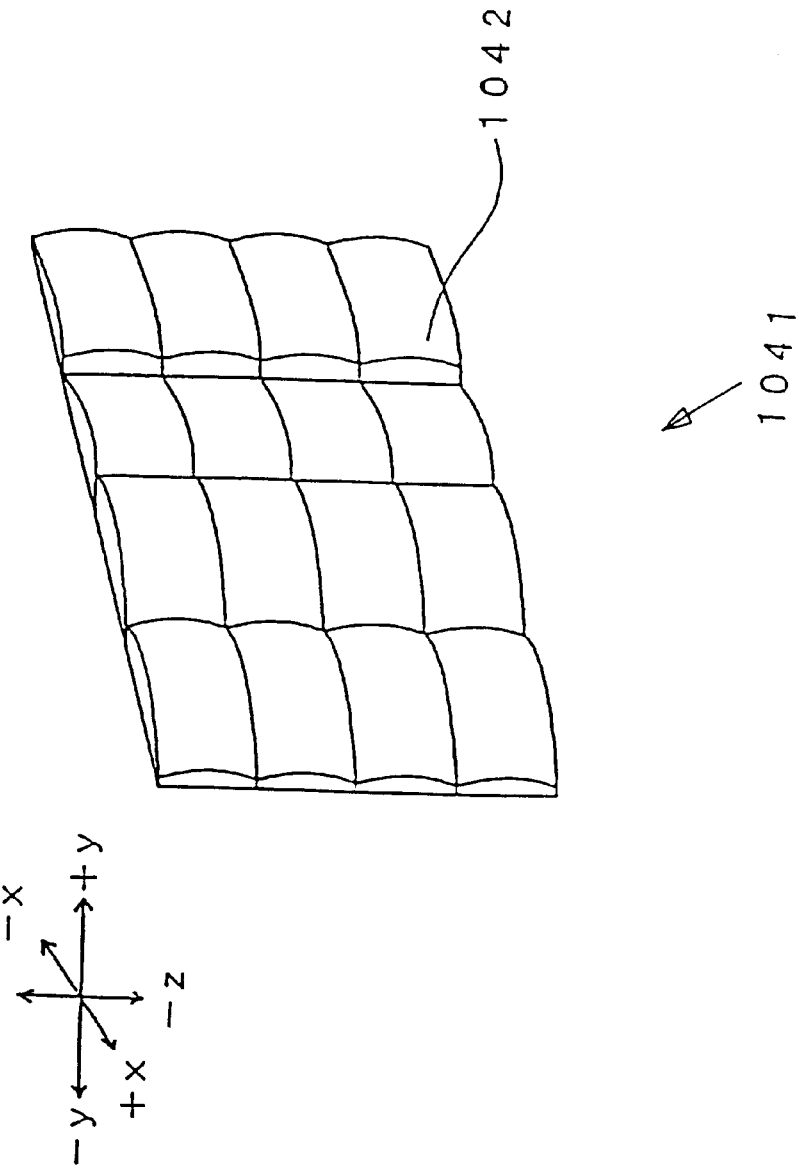
FIG. 7 is a perspective view of a lens plate in the polarization illuminating device shown in FIG. 1.

The converging mirror plates 1001x and 1002 are formed by minute converging mirrors 1003 having a converging function, so that they substantially reverse the traveling direction of an incident light. Further, they form a plurality of converging images in the same number of the minute converging mirrors 1003 constituting each converging mirror plate, 1001x, 1001. Since these converging images are the same as light source images, they will be hereinafter referred to as secondary light source images. The converging lens plate 1041 is a lens composite made of rectangular minute lenses 1042 as shown in FIG. 7, and the number of the minute lenses 1042 constituting the converging lens plate 1041 is equal to the number of the minute converging mirrors 1003 constituting the converging mirror plate 1001x, 1002. In this embodiment, eccentric lenses are adopted for the plurality of minute lenses 1042. Further, it is also possible to use a converging lens plate in which the size in the x-axis direction of the minute lenses is matched with the size in the x-axis direction of a phase difference layer 1044 described below and in which the number of minute lenses arranged in the x-axis direction is doubled. In that case, it is possible to guide the luminous fluxes impinging upon the converging lens plate from the two converging mirror plates 101x and 1002 to the illumination region 301 with higher efficiency.

Figure 8:
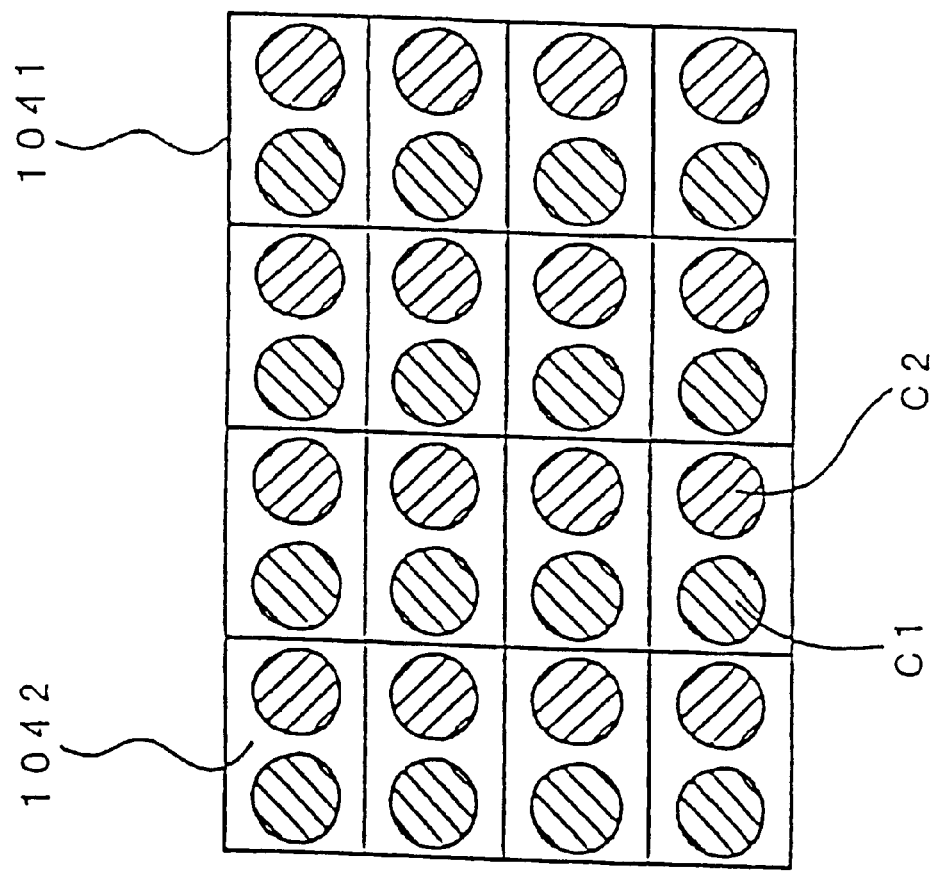
FIG. 8 is explanatory diagram showing a position where a secondary light source image is formed in a converging lens plate in the polarization illuminating device shown in FIG. 1.

The converging mirror plate 101x is arranged so as not to be orthogonal to an axis orthogonal to the xz-plane, and the converging mirror plate 1002 is arranged so as not to be orthogonal to an axis orthogonal to the yz-plane. That is, they are arranged so as to make an angle β with respect to the xz-plane and the yz-plane. Thus, the secondary light source image due to the P-polarized light and the secondary light source image due to the S-polarized light are formed at slightly different positions. That is, as shown in FIG. 8, which illustrates the secondary light source images formed by the two kinds of polarized light as seen from the illumination region 301 side toward the converging lens section 1040, a secondary light source image C1 due to the P-polarized light (a circular image with sloped lines inclined to the right) and a secondary light source image C2 due to the S-polarized light (a circular image with sloped lines inclined to the left) are formed so as to be arranged horizontally side by side. In contrast, on the surface on the illumination region 301 side of the converging lens plate 1041, there is provided a λ/2 phase difference plate 1043 on which phase difference layers 1044 are selectively formed in correspondence with the positions where the secondary light source images C1 due to the P-polarized light are formed. Thus, the P-polarized light is subjected to the rotary action of the polarization surface when passing the phase difference layers 1044, and the P-polarized light is converted to S-polarized light. On the other hand, since the S-polarized light is not transmitted through the phase difference layers 1044, it is transmitted through the λ/2 phase difference plate 1043 without being subjected to the rotary action of the polarization surface. Thus, most of the luminous fluxes to be output from the converging lens section 1040 are adjusted into S-polarized light.

The luminous fluxes thus adjusted into S-polarized light are output from the converging lens section 1040, and then applied to the illumination region 301 by way of the reflection mirror 300. That is, the images formed by the minute converging mirrors 1003 of the converging mirror plates 1001x and 1002 are superimposed one upon the other at one place by the converging lens plate 1041, and converted to a single kind of polarized light when passing the λ/2 phase difference plate 1043, with the result that most of the light reaches the illumination region 301. Thus, the illumination region is uniformly illuminated substantially with a single kind of polarized light.

The process shown in FIG. 2 in which the random polarized light emitted from the second light source section 101z is direction-separated along the x-axis in accordance with the direction of polarization, is on the same principle as the process described with reference to FIGS. 1 and 4, so a detailed description thereof will be omitted.

In FIG. 2, of the random polarized light emitted from the second light source section 101z, the P-polarized light is transmitted through the polarization separation layer 211z of the separation section 202 and heads for the exit surface 1012z, whereas the S-polarized light is reflected by the polarization separation layer 211z and changes its traveling direction to the exit surface 1013 of the polarization separation 202. The P-polarized light and the S-polarized light thus obtained through separation are respectively transmitted through the λ/4 phase difference plates 1021z and 1022, and reflected by the converging mirror plates 1001z and 1002 before they are transmitted through the λ/4 phase difference plates 1021z and 1022 again. Thus, the traveling direction of the P-polarized light which has reached the exit surface 1012z is reversed substantially by 180° by the λ/4 phase difference plates 1021z and the converging mirror plate 1001z and, at the same time, the P-polarized light is converted to S-polarized light and reversed by the polarization separation layer 211z to change its traveling direction before it heads for the exit surface 1014. On the other hand, the traveling direction of the S-polarized light which has reached the exit surface 1013 is reversed substantially by 180° by the λ/4 phase difference plates 1022 and the converging mirror plate 1002 and, at the same time, the S-polarized light is converted to P-polarized light, which is transmitted through the polarization separation layer 211z and heads for the exit surface 1014.

Like the converging mirror plates 1001x and 1002, the converging mirror plate 1001z is made of minute converging mirrors 1003 having a converging function. And it is arranged so as not to be orthogonal to an axis orthogonal to the yz-plane, that is, so as to make an angle β with respect to the yz-plane. Thus, the secondary light source image due to the P-polarized light and the secondary light source image due to the S-polarized light are formed at slightly different positions. However, the secondary light source image formed overlaps the secondary light source image due to the S-polarized light and the secondary light source image due to the P-polarized light contained in the light emitted from the first light source section 201x. Thus, like the light emitted from the first light source section 201x, the light emitted from the second light source section 201z is adjusted into S-polarized light. As a result, the light emitted from the first and second light source sections 201x and 201z are synthesized as S-polarized light and applied to the illumination region 301 by way of the reflection mirror 300.

As described above, in the polarization illuminating device 1 of this embodiment, random polarized lights emitted from the first and second light source sections 101x and 101z are direction-separated into two kinds of polarized light by the polarization separation section 202, and then the polarized lights are led to a predetermined region of the λ/2 phase difference plate 1043, the P-polarized light being converted to S-polarized light. Thus, the random polarized lights emitted from the first and second light source sections 101x and 101z are synthesized in a state substantially adjusted into S-polarized light without involving any loss, whereby the illumination region can be brightly illuminated. Further, although two light source sections 101x and 101z are used, the area illuminated is one corresponding to a single light source, so that it is possible to double the quantity of light per fixed area as compared to the case in which a single light source is used. Further, both of the two light source sections, the first and second light source sections 101x and 101z, can be arranged in the zx-plane. In this case, there is provided the reflection mirror 300 for changing the traveling direction of the illumination luminous flux emitted from the converging lens section 1040, so that the zx-plane, in which the two light source sections are arranged, and the emitting direction of the illumination luminous flux can be made parallel to each other. This helps to reduce the thickness and height of the illuminating device. That is, due to the angle variation mirror arranged on the output side of the converging lens section 1040, the degree of freedom in design for reducing the size of the polarization illuminating device is further enhanced.

To guide the two kinds of polarized light to a predetermined region of the λ/2 phase difference plate 1043, it is necessary for the polarization separation section 202 to have a high level of polarization separation performance. In this embodiment, the polarization separation section 202 is formed by utilizing a glass prism and a dielectric multilayer film made of an inorganic material, so that the polarization separation performance of the polarization separation section 202 is thermally stable. Thus, even in an illuminating device of which a large light output is required, a stable polarization separation performance is always available, whereby it is possible to realize a polarization illuminating device having a satisfactory performance.

Further in this embodiment, in accordance with the configuration of the horizontally elongated rectangular illumination region 301, the minute converging mirrors 1003 of the first through third converging mirror plates 1001x, 1002 and 1001z have a horizontally elongated rectangular configuration and, at the same time, the two kinds of polarized light emitted from the polarization separation section 202 are separated in the horizontal direction (the x-direction). Thus, even when the illumination region 301 having a horizontally elongated rectangular configuration is formed, it is possible to enhance the illumination efficiency without wasting any quantity of light.

While in this embodiment the λ/2 phase difference plate 1043 is arranged on the illumination region side of the converging lens plate 1041, it may also be arranged at some other position as long as it is in the vicinity of the position where the secondary light source image is formed. For example, the λ/2 phase difference plate 1043 may be arranged on the light source section side of the converging lens plate 1041.

Further, while in this embodiment the minute lenses 1042 constituting the converging lens plate 1041 are horizontally elongated rectangular lenses, there is no particular limitation regarding their configuration. However, as shown in FIG. 8, the secondary light source image C1 formed by the P-polarized light and the secondary light source image C2 formed by the S-polarized light are arranged horizontally side by side, so that it is desirable to determine the configuration, number, etc. of the minute lenses 1042 constituting the converging lens plate 1041 in accordance with the positions where these images are formed.

Further, it is also possible to arrange two kinds of phase difference layers of different characteristics at the converging position for the P-polarized light and the converging position for the S-polarized light, respectively, and adjust them into a single kind of polarized light having a particular direction of polarization, or it is possible to arrange the phase difference layer 1044 at the position where the secondary light source image C2 due to the S-polarized light is formed and to extract the P-polarized light.

[Second Embodiment]

Figure 9:
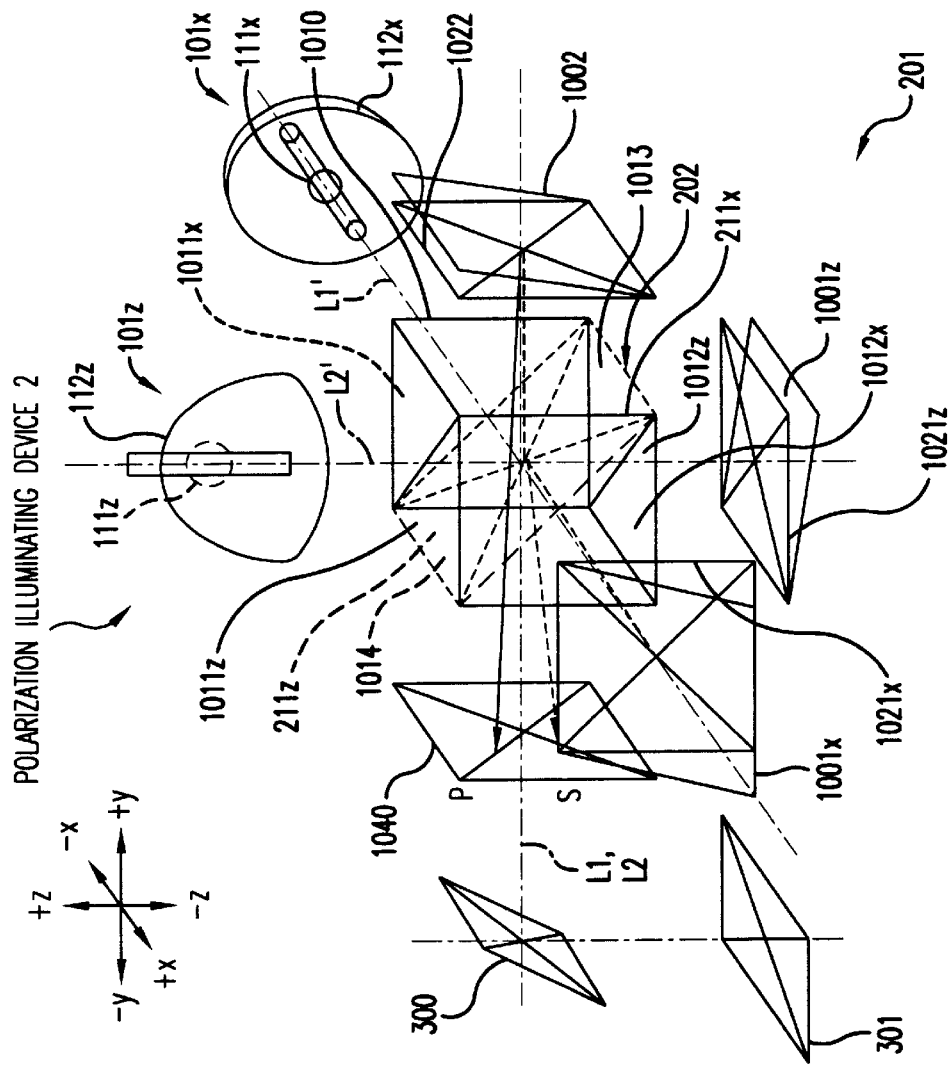
FIG. 9 is an explanatory diagram illustrating a polarizing operation for light from a first light source section of a polarization illuminating device according to a second embodiment of the present invention.
Figure 10:
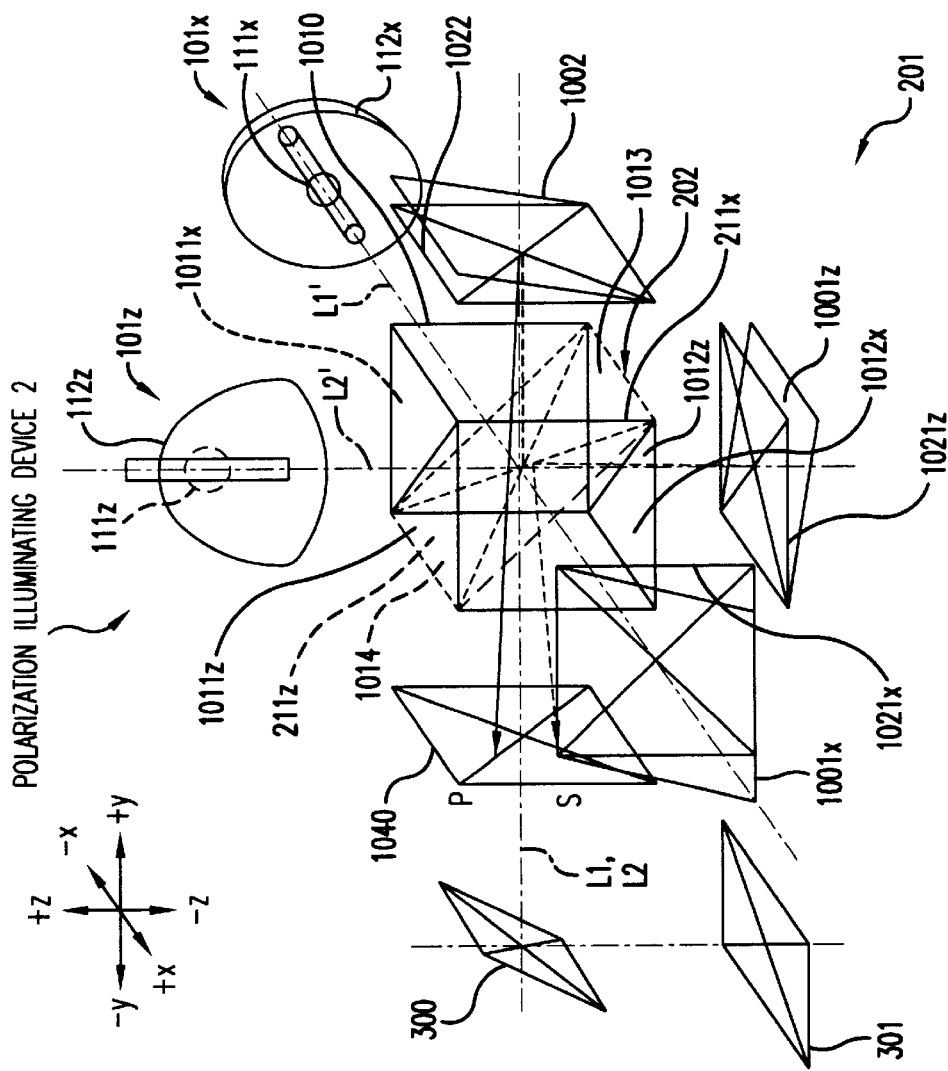
FIG. 10 is an explanatory diagram illustrating a polarizing operation for light from a second light source section of the polarization illuminating device according to the second embodiment of the present invention.

While in the polarization illuminating device 1 shown in FIGS. 1 and 2 the secondary light source image formed by the P-polarized light and the secondary light source image formed by the S-polarized light are arranged side by side in parallel with the x-axis, the secondary light source image formed by the P-polarized light and the secondary light source image formed by the S-polarized light may also be arranged side by side in parallel with the z-axis as in the polarization illuminating device 2 shown in FIGS. 9 and 10. In this case, it is only necessary to change the inclination directions of the first through third converging mirror plates 1001x, 1002 and 1001z with respect to the yz-plane, zx-plane and xy-plane. As to its basic principle, it is the same as that of the polarization illuminating device 1, so a detailed description thereof will be omitted.

[Third Embodiment]

In the structures shown in FIGS. 1 and 2 or FIGS. 9 and 10, it is possible to use an angle variation prism in forming the secondary light source images of the S-polarized light and the P-polarized light at positions deviated in the x-direction or the z-direction. In this case, in the polarization illuminating device 1 or the polarization illuminating device 2, shown in FIGS. 1 and 2 or FIGS. 9 and 10, an angle variation prism is provided between the polarization separation section 202 and the first converging mirror plate 1001x, between the polarization separation section 202 and the second converging mirror plate 1002, and between the polarization separation section 202 and the third converging mirror plate 1003.

Figure 11:
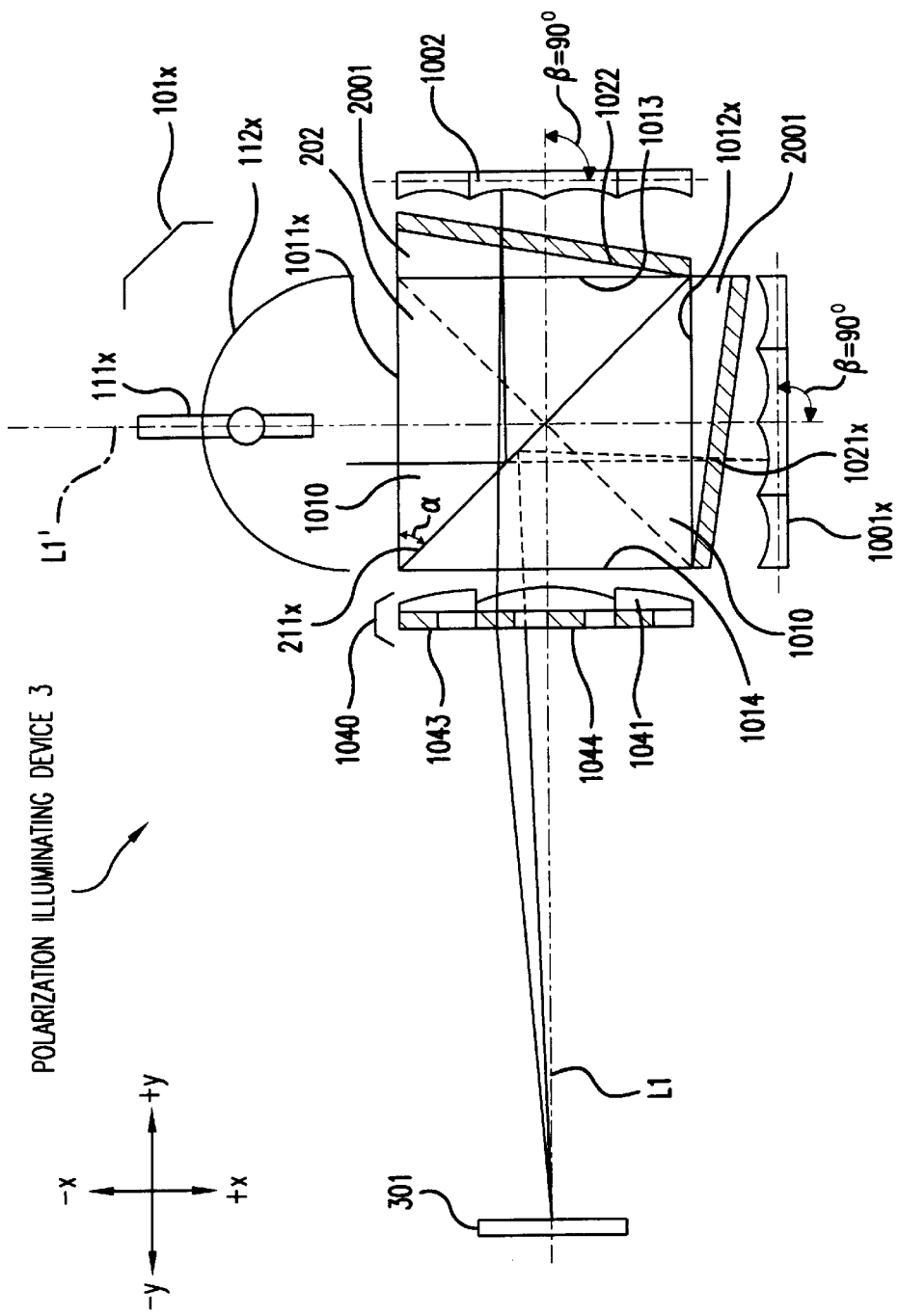
FIG. 11 is a schematic diagram showing the basic structure if an optical system formed in a polarization illuminating device according to a third embodiment of the present invention.

FIG. 11 is sectional view, taken along the xy-plane, of the polarization illuminating device shown in FIGS. 1 and 2, with an angle variation prism 2001 being provided. As can be seen from the drawing, in the case of this polarization illuminating device 3, all of the first through third converging mirror plates 1001x, 1002 and 1001z can be arranged at positions perpendicular to the system optical axis L1', L2' (or the system optical axis L1, L2), so that the provision of the converging mirror plates is facilitated.

In this embodiment, the angle variation prism 2001 is integrated with the exit surfaces 1012x, 1012z and 1013 by optical adhesion, whereby the reflection loss of light at the interface can be reduced.

Further, the first through third λ/4 phase difference plates 1021x, 1022 and 1021z may be arranged between the exit surface of the polarization separation section 202 and the angle variation prism 2001.

[Fourth Embodiment]

Figure 12:
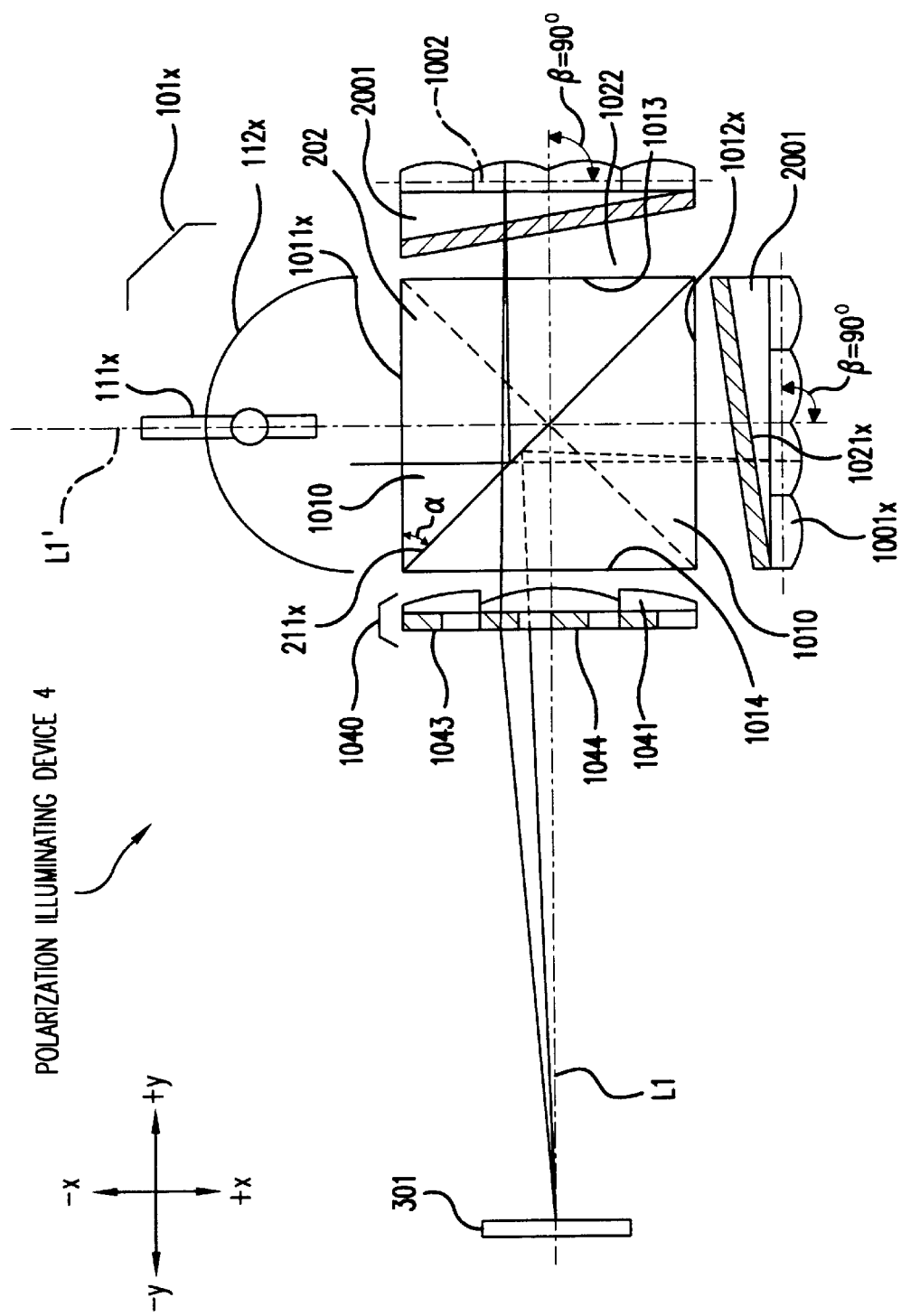
FIG. 12 is a schematic diagram showing the basic structure of an optical system formed in a polarization illuminating device according to a fourth embodiment of the present invention.

As in the polarization illuminating device 4 shown in FIG. 12, it is also possible to integrate the angle variation prism 2001 with the first and third converging mirrors 1001x and 1001z and also integrate it with the second converging mirror plate 1002. In this case also, the reflection loss of light at the interface can be reduced. In this case also, the first through third λ/4 phase difference plates 1021x, 1022 and 1021z can be arranged between the first through third converging mirror plates 1001x, 1002 and 1001z and the angle variation prisms 2001.

[Fifth Embodiment]

Figure 13:
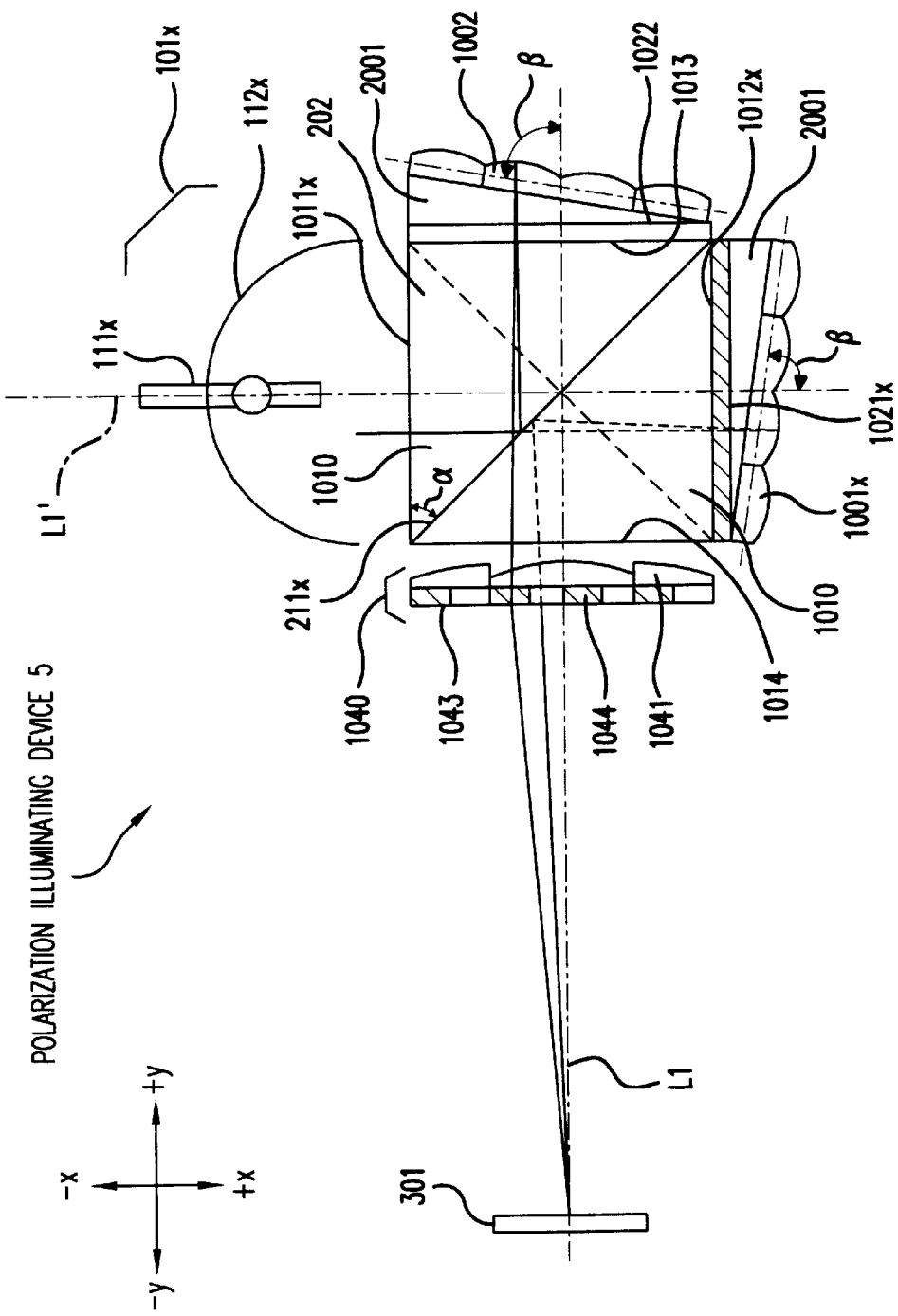
FIG. 13 is a schematic diagram showing the basic structure of an optical system formed in a polarization illuminating device according to a fifth embodiment of the present invention.

Further, as in the polarization illuminating device 5 shown in FIG. 13, by adjusting the converging characteristics of the minute converging mirrors constituting the first through third converging mirrors 1001x, 1002 and 1001z, it is possible to integrate all of the first through third λ/4 phase difference plates 1021x, 1022 and 1021z, the angle variation prisms 2001, and the first through third converging mirror plates 1001x, 1002 and 1001z. In this case, the reflection loss of light at the interface can be reduced and, at the same time, the size of the entire optical system can be reduced. In this case also, the first through third λ/4 phase difference plates 1021x, 1022 and 1021z can be arranged between the first through third converging mirror plates 1001x, 1002 and 1001z and the angle variation prisms 2001.

[Sixth Embodiment]

Figure 14:
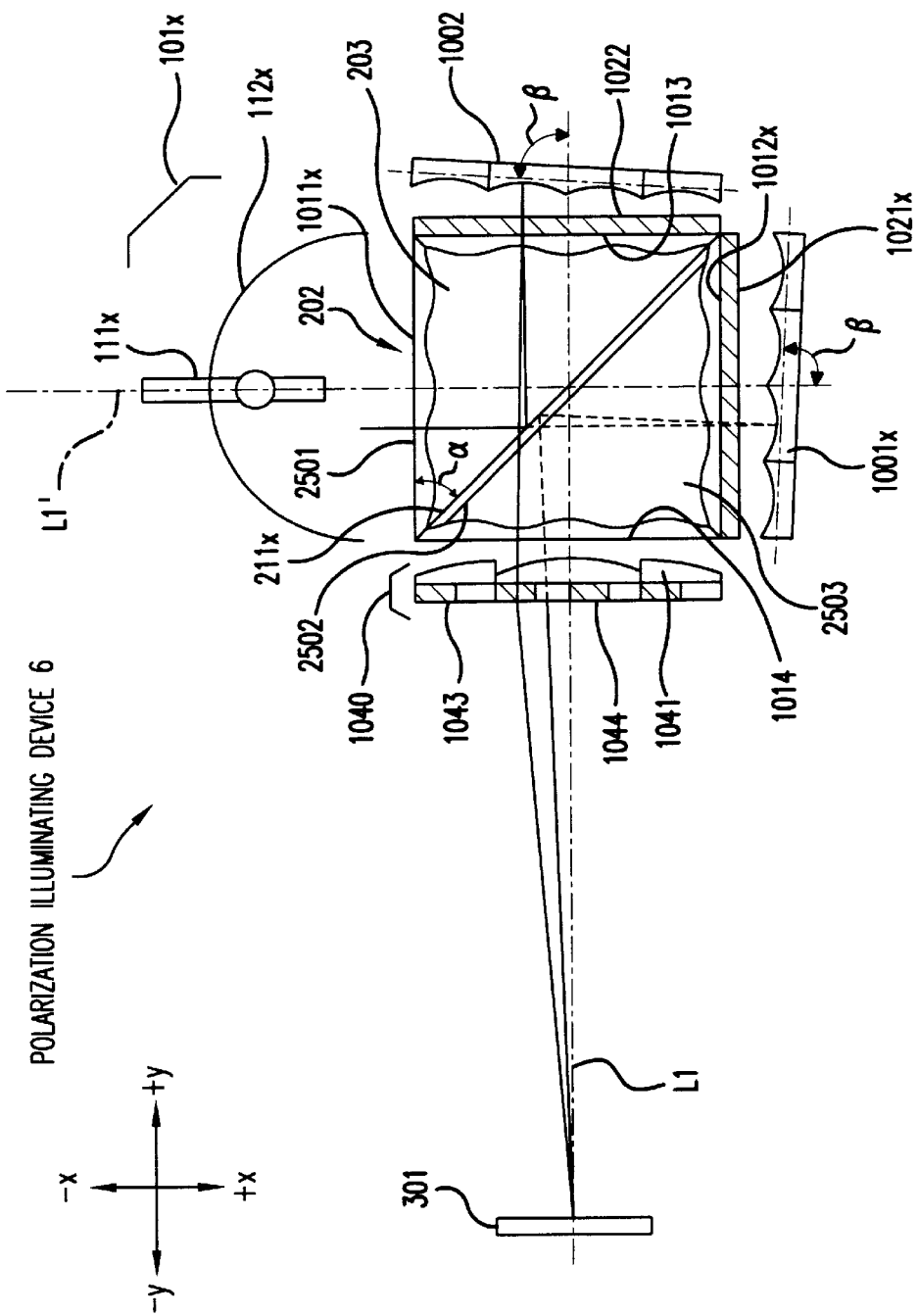
FIG. 14 is a schematic diagram showing the basic structure of an optical system formed in a polarization illuminating device according to a sixth embodiment of the present invention.

In the polarization illuminating device 6 shown in FIG. 14, the arrangement of the optical systems is the same as that of the first embodiment. This embodiment is characterized in that a prism structure 203 is formed by six transparent plates 2501 constituting wall surfaces, and a flat polarization separation plate 2502 in which a polarization separation layer 211 is formed is arranged and, further, a structure filled with a liquid 2503 is used as the polarization separation section 202. However, it is necessary for the refractive indexes of the transparent plates 2501, the polarization separation plate 2502 and the liquid 2503 to substantially coincide with each other. Due to this arrangement, the cost and weight of the polarization separation section 202 can be reduced.

[Seventh Embodiment]

Figure 15:
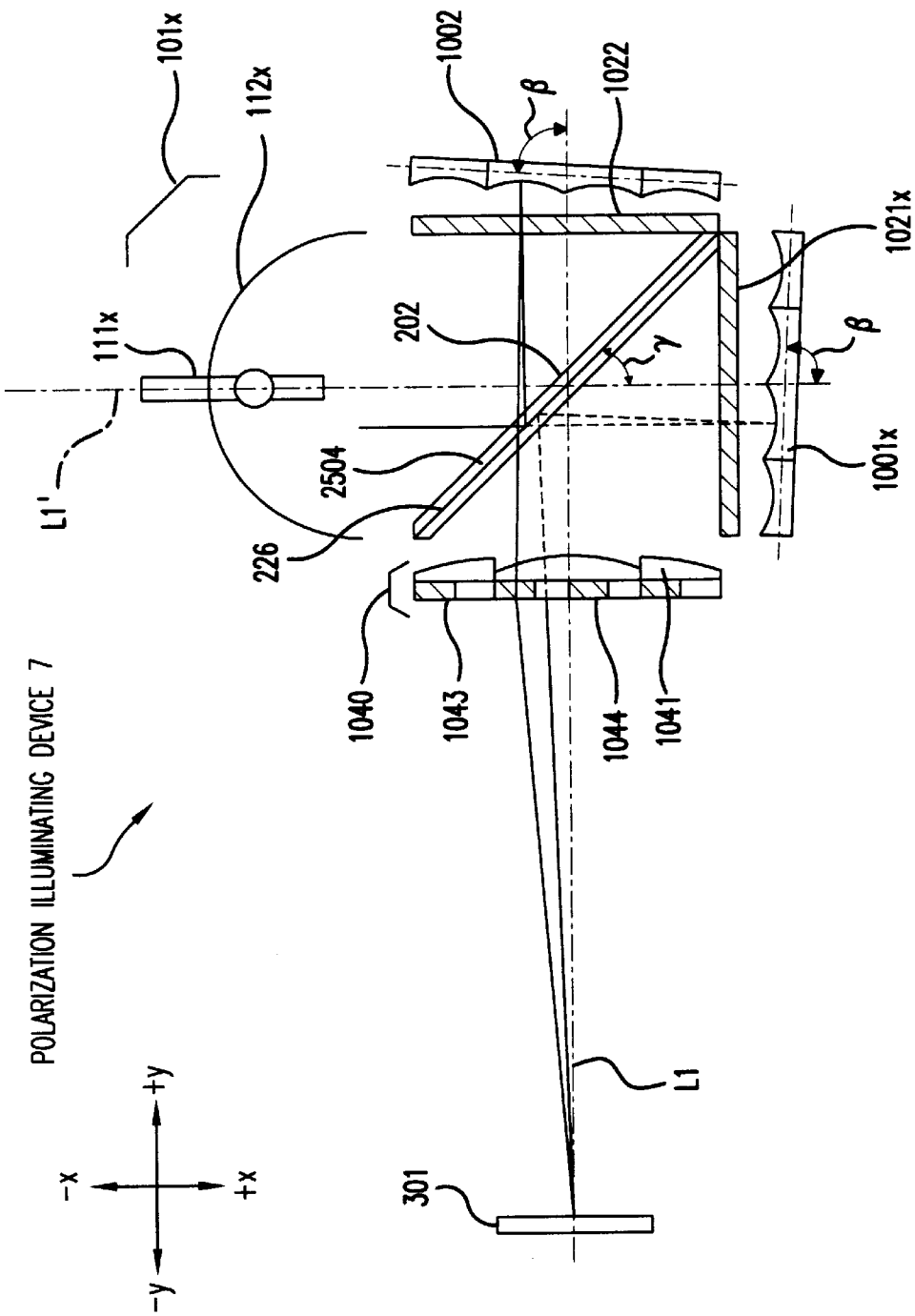
FIG. 15 is a schematic diagram showing the basic structure of an optical system formed in a polarization illuminating device according to a seventh embodiment of the present invention.

In the polarization illuminating device 7 shown in FIG. 15, the arrangement of the optical systems is the same as that of the first embodiment. This embodiment is characterized in that the polarization separation section 202 is formed as a flat structure. That is, a polarization separation plate 2504 in which a polarization separation layer 226 is held between two glass substrates is arranged so as to make an angle of y=45° with respect to the system optical axis L1', L2' (L1, L2), whereby the same function as that of the polarization separation section 202 using a prismatic prism (See FIG. 1) can be achieved, whereby the cost and weight of the polarization separation section 202 can be reduced.

[Eighth Embodiment]

Figure 16:
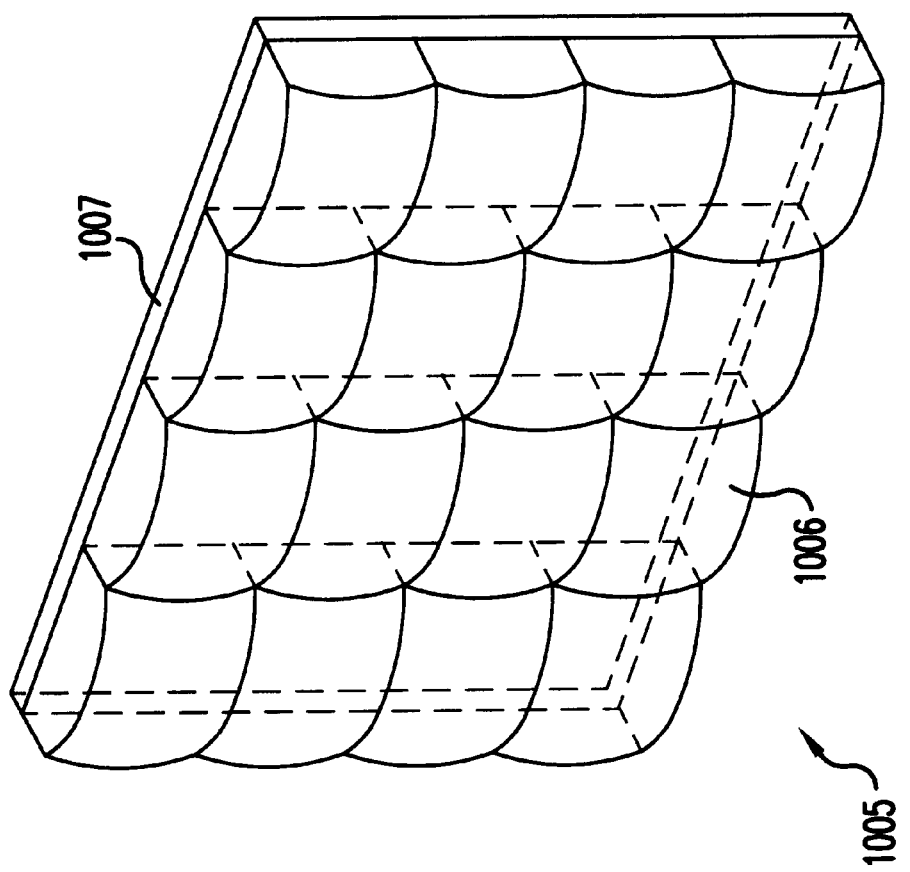
FIG. 16 is an explanatory diagram of an eighth embodiment of the present invention, showing a converging mirror plate that can be used in the polarization illuminating device according to the first through seventh embodiments.

In the polarization illuminating devices 1 through 7 described above, the first through third converging mirror plates 1001x, 1002 and 1001z may partially or entirely comprise a converging mirror plate 1005 as shown in FIG. 16. The converging mirror plate 1005 is made of a plurality of minute lenses 1006 and a mirror plate 1007. In this structure, when each of the plurality of minute lenses 1006 comprises an eccentric lens, the converging mirror plate 1005 can be arranged parallel to the exit surfaces 1012x, 1012z and 1013 of the polarization separation section 202, so that the installation of the converging mirror plate 1005 is facilitated.

It is also possible for the reflection surfaces 1004 of the first through third converging mirror plates 1001x, 1001z and 1002 to partially or entirely comprise eccentric reflection surfaces. In this case, these mirror plates can be arranged parallel to the exit surfaces 1012x, 1012z and 1013 of the polarization separation section 202, so that the installation of the first through third converging mirror plates 1001x, 1001z and 1002 is facilitated.

[Ninth Embodiment]

Figure 17:
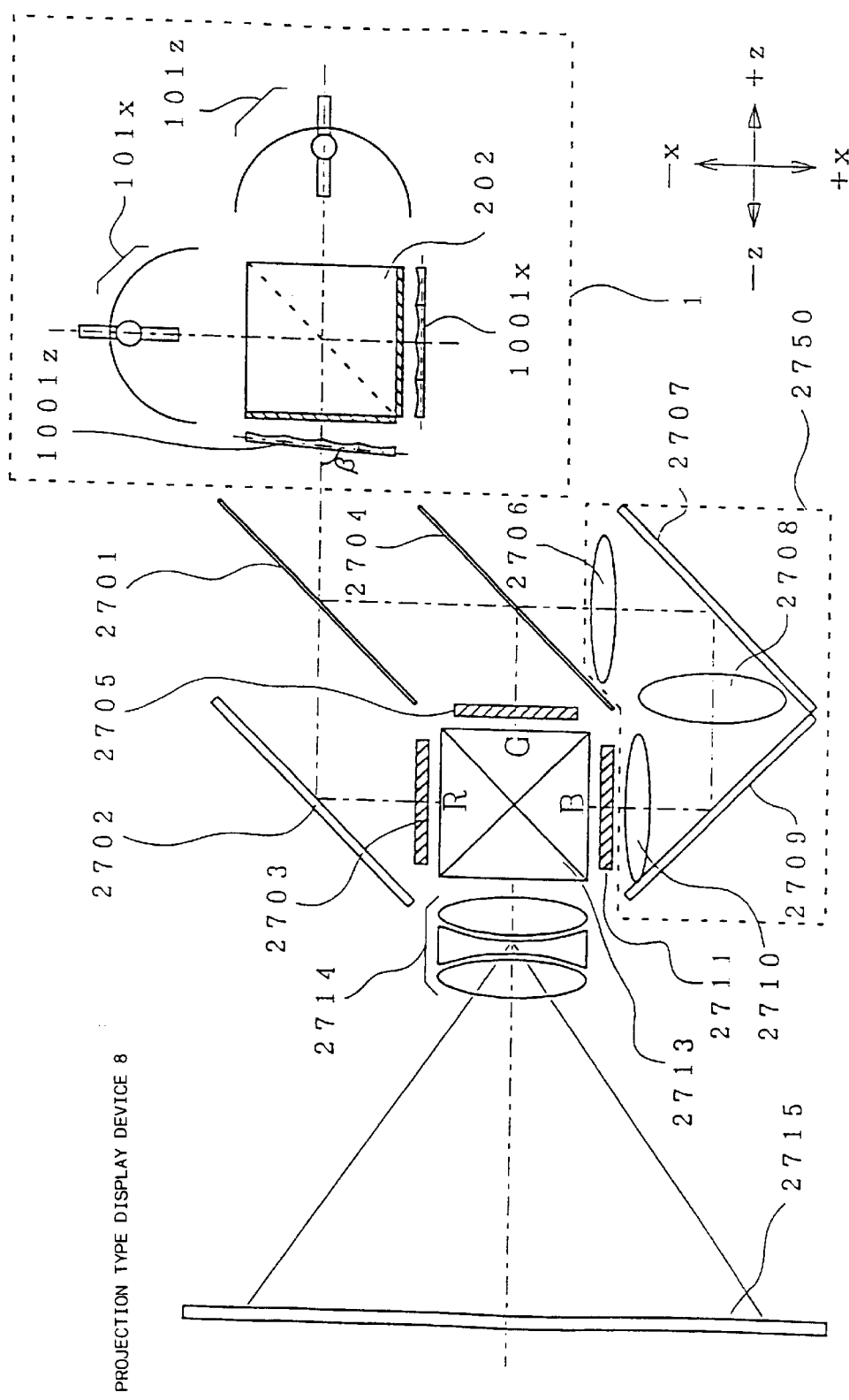
FIGS. 17 and 18 are schematic diagrams showing the structure of an optical system in an example of a projection type display device equipped with the polarization illuminating optical system shown in FIGS. 1, 2 and 4.
Figure 18:
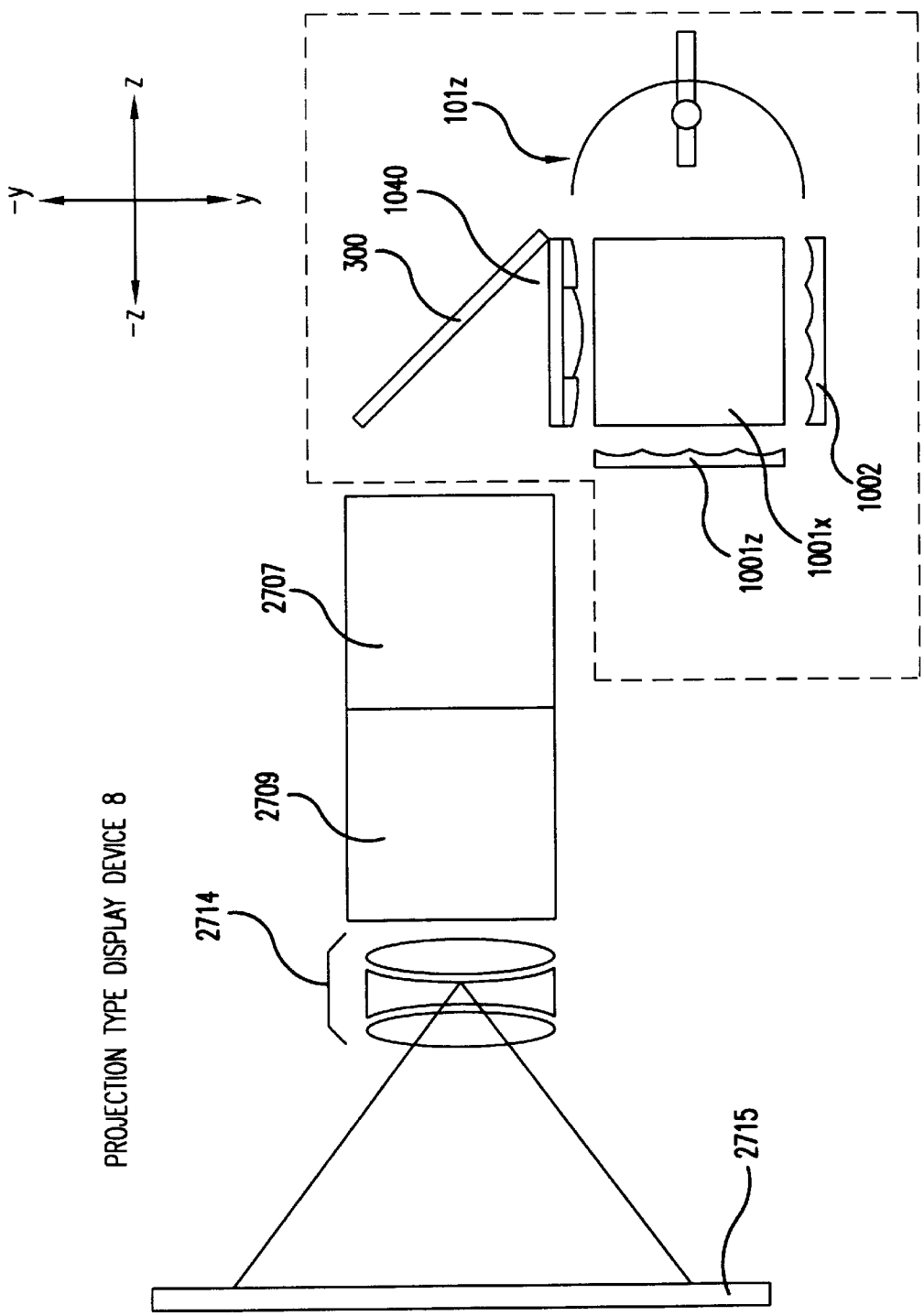

FIGS. 17 and 18 show an example of a projection type display device in which the brightness of the projection image is improved by using the polarization illuminating device 1 of the first embodiment of the polarization illuminating devices of the first through eighth embodiments. In the projection type display device of this embodiment, two kinds of light source lamps of different emission spectra are used for the two light source sections of the polarization illuminating device 1, and the light source lamps can be selectively lighted.

In FIGS. 17 and 18, the polarization illuminating device 1 incorporated in the projection type display device 8 of this embodiment includes a first light source section 101x and a second light source section 101z adapted to emit random polarized light in one direction, and the random polarized light emitted from these light source sections is separated into two kinds of polarized light in the polarization separation section 202. Further, of the polarized lights obtained through separation, the P-polarized light is converted to S-polarized light by the λ/2 phase difference plate 1043 of the converging lens section 1040, and emitted from the converging lens section as substantially a single kind of polarized light (S-polarized state). The emitting direction of the polarized luminous flux emitted from the converging lens section is changed to the −z-direction by the reflection mirror 300, and impinges upon a blue/green reflective dichroic mirror 2701.

Of the luminous flux emitted from this polarization illuminating device 1, red light is first transmitted through the blue/green reflective dichroic mirror 2701, and blue and green lights are reflected. The red light is reflected by a reflection mirror 2702, and reaches a first liquid crystal light valve 2703. Of the blue and green lights, the green light is reflected by a green reflective dichroic mirror 2704, and reaches a second liquid crystal light valve 2705.

Since the optical path of the blue light is longer than that of the other two lights, there is provided for the blue light a light guiding means 2750 comprising a relay lens system comprising an incident side lens 2706, a relay lens 2708 and an exit side lens 2710. That is, after being transmitted through the green reflective dichroic mirror 2704, the blue light is first led to the relay lens 2708 by way of the incident side lens 2706 and a reflection mirror 2707, and converged on this relay lens 2708 before it is led to the exit side lens 2710 by a reflection mirror 2709. After this, it reaches a third liquid crystal light valve 2711. Here, the first through third light liquid crystal light valves 2703, 2705 and 2711 modulate the color lights and the modulated color lights with corresponding image information are caused to impinge upon a dichroic prism 2713. In the dichroic prism 2713, a red reflective dielectric multilayer film and a blue reflective dielectric multilayer film are formed in a cross configuration to synthesize a modulated luminous flux. The synthesized luminous flux is transmitted through a projection lens 2714 and forms an image on a screen 2715.

In the projection type display device 8, constructed as described above, a liquid crystal light valve is used which is of the type which modulates a single kind of polarized light. Thus, when random polarized light is led to the liquid crystal light valve by using a conventional illuminating device, half the random polarized light is absorbed by the polarizing plate and turned into heat, so that the efficiency in the utilization of light is rather low, and it is necessary to provide a large and noisy cooling device for restraining the heat generation of the polarizing plate. In the projection type display device 8 of this embodiment, this problem is substantially eliminated.

That is, in the projection type display device 8 of this embodiment, in the polarization illuminating device 1, a polarizing surface rotating action is given by the λ/2 phase difference plate 1043 only with respect to one polarized light (for example, P-polarized light), and the polarizing surface thereof is aligned with that of the other polarized light (for example, S-polarized light). Thus, polarized lights whose directions of polarization are aligned are led to the first through third liquid crystal light valves 2703, 2705 and 2711, whereby the efficiency in the utilization of light is improved and a bright projection image can be obtained. Further, since the quantity of light absorbed by the polarizing plate is reduced, the rise in temperature in the polarizing plate is restrained. Thus, it is possible to realize a reduction in the size and noise of the cooling device. Further, since two light source sections, the first and second light source sections 101x and 101z, are provided, and the directions of polarization are aligned so as not to involve any loss with respect to the light emitted from either light source section, it is possible to obtain a bright projection image. Further, in the polarization illuminating device 1, a thermally stable dielectric multilayer film is used as the polarization separation layer, so that the polarization separation performance of the polarization separation section 202 is thermally stable. Thus, even in the projection type display device 8, of which a large light output is required, a stable polarization separation performance is always available.

Further, in the polarization illuminating device 1, the two kinds of polarized light output from the polarization separation section 202 are separated in the horizontal direction, so that it is possible to form an illumination region having a horizontally elongated rectangular configuration without wasting any quantity of light. Thus, the polarization illuminating device 1 is suitable for a horizontally elongated liquid crystal light valve capable of projecting an image easy to see and forceful.

In addition, in this embodiment, the dichroic prism 2713 is used as the color synthesizing means, so that it is possible to achieve a reduction in size. Further, the length of the optical path between the liquid crystal light valves 2703, 2705 and 2711 and the projection lens 2714 is small. Thus, even when a projection lens of a relatively small diameter is used, it is possible to realize a bright projection image. Further, regarding the color lights, only one of the three optical paths has a different length. In this embodiment, there is provided for the blue color, which has the longest optical path, the light guiding means 2750 comprising a relay lens system comprising the incident side lens 2706, the relay lens 2708 and the exit side lens 2710, so that no unevenness in color is generated. Further, in this embodiment, the reflection mirror 300, which is an optical path changing element, is arranged between the converging lens section 1040, which is a polarization conversion means, and the blue/green reflective dichroic mirror 2701, so that it is possible to change the traveling direction of the polarized luminous flux emitted from the polarization conversion means, so that it is possible to arrange the plane in which the color light separation means, color light synthesis means, light modulation means, projection optical system, etc. are arranged parallel to the plane including the polarization illuminating device 1 having two relatively large light source sections, whereby the thickness of the projection display device is reduced in one direction only, thereby realizing a thin projection display device.

Further, in the polarization illuminating device 1 incorporated in the projection type display device 8 of this embodiment, either the first or second light source section 101x or 101z can be made detachable. Due to this structure, it is possible to detach one of the light source sections when, for example, carrying the projection type display device 8, thereby achieving an improvement in terms of portability.

In the two light source sections 101x and 101z of the polarization illuminating device 1 incorporated in the projection type display device 8 of this embodiment, two kinds of light source lamps having different emission spectra and brightness characteristics are used and, further, these light source lamps can be selectively lighted.

By adopting this structure, the following effects can be obtained:

1) By making it possible to selectively light two kinds of light source lamps having different emission spectra, the observer is enabled to appropriately vary the tone of the projection image as desired.
2) By making it possible to selectively light two light source lamps, the observer is enabled to appropriately vary the brightness of the projection image as desired in accordance with the environment. Thus, in a place where the environment is bright, the two light source sections are lighted, and, in a place where the environment is dark, only one of the light source sections is lighted.
3) By adopting a form in which two light source lamps can be selectively used, it is possible to extend the service life of the light source lamps and, at the same time, when, for example, one light source lamp cannot be lighted because it is at the end of its service life or out of order, it is possible to continue to display the projection image by using the other light source lamp, thus achieving an improvement in terms of convenience of use. Further, when, for example, battery-driving the projection type display device 8, it is possible to extend the service life of the battery by selectively lighting one light source lamp alone.

Further, in relation to the above 1), with the projection type display device 8 of this embodiment, the following advantage can be expected. It is ideal for a light source lamp used in a projection type display device to have a large light output in all the wavelength ranges of blue light, green light and red light, with their proportion being well-balanced. As matters now stand, however, no such ideal light source lamp is practically available.

Figure 19:
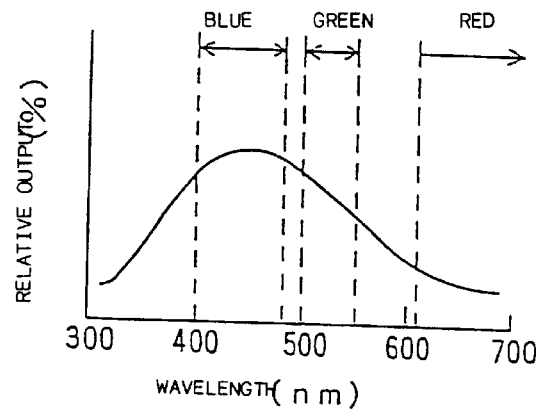
FIGS. 19A–19C are explanatory diagram showing the emission spectrum of the light source lamp of a polarization illuminating device.
Figure 19:
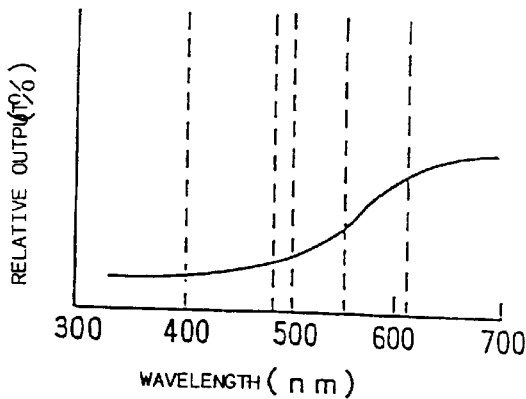
Figure 19:
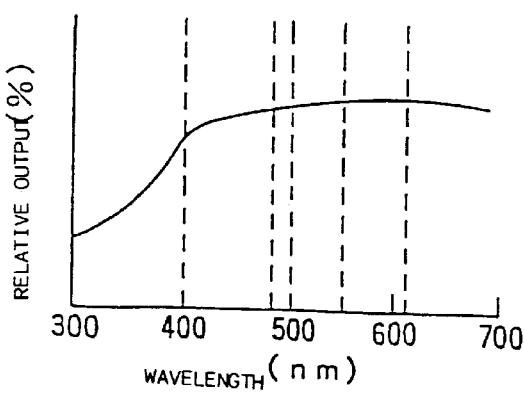

FIG. 19 is an explanatory diagram showing spectra of light emitted from light source lamps and a polarization illuminating device. With reference to this diagram, a specific explanation will be given. For example, as shown in (A), the light emission efficiency is relatively high while the intensity of the red light is relatively low (this case corresponds to an ordinary high pressure mercury-vapor lamp), or as shown in (B), the light emission intensity of the red light is relatively high while the light emission efficiency of the whole is relatively low (this case corresponds to a certain type of metal halide lamp). With the current state of the art regarding the light source lamps, when two kinds of light source lamps having emission spectra as shown in (A) and (B) are used in the polarization illuminating device 1 of the projection type display device 8 of this embodiment in a state in which they are simultaneously lighted, the spectrum of light emitted from the polarization illuminating device 1 can be an ideal one as shown in (C), thus making it possible to easily realize a projection type display device which can provide a bright, high-quality projection image.

It goes without saying that, instead of the polarization illuminating device 1, the above-described polarization illuminating devices 2 through 8 can be used.

[Tenth Embodiment]

Figure 20:
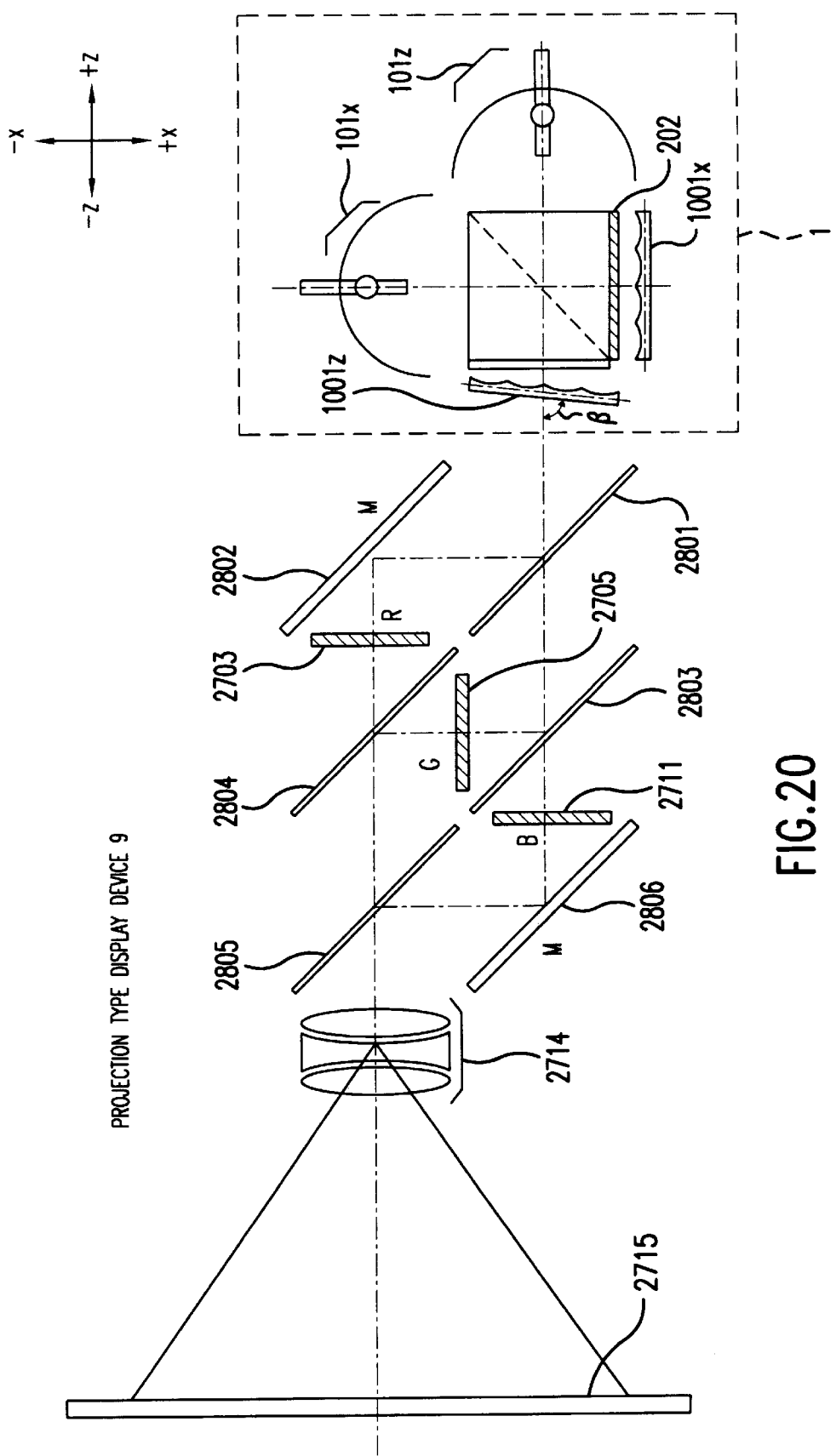
FIG. 20 is a schematic diagram showing the structure of an optical system in another example of a projection type display device equipped with the polarization illuminating optical system shown in FIGS. 1, 2 and 4.

As shown in FIG. 20, the projection type display device may be one in which the color light synthesis means is formed by a mirror optical system. When a mirror optical system is used for the color light synthesis means, the three liquid crystal light valves 2703, 2705 and 2711 are separated from the light source section 101 by optical paths having the same length, so that it is possible to effect an efficient illumination involving little unevenness in brightness and color.

That is, in the projection type display device 9 shown in FIG. 20, the polarization illuminating device 1 as shown in FIGS. 1, 2 and 4 is used, and the random polarized light emitted from the first light source section 101x and the second light source section 101z (not shown) is separated into two kinds of polarized light in the polarization separation section 202, and, of the polarized lights obtained through separation, the P-polarized light is converted to S-polarized light by the λ/2 phase difference plate 1043 of the converging lens section 1040.

Of the luminous flux emitted from this polarization illuminating device 1 (in this embodiment also, there is provided, as in the case of the above-described projection type display device 8, a reflection mirror constituting an optical path changing element, which, however, is not shown in FIG. 20), the red light is first reflected by the red reflective dichroic mirror 2801, and the blue light and the green light are transmitted. The red light is reflected by the reflection mirror 2802, and reaches the first liquid crystal light valve 2703. On the other hand, of the blue light and the green light, the green light is reflected by the green reflective dichroic mirror 2803, and reaches the second liquid crystal light valve 2705. The blue light is transmitted through the green reflective dichroic mirror 2803 and then reaches the third liquid crystal light valve 2711 (color light separation means). After this, the first through third liquid crystal light valves 2703, 2705 and 2711 modulate the color lights, and, after imparting image information corresponding to each color, output the modulated color lights (optical modulators). Here, the intensity-modulated red light is transmitted through the green reflective dichroic mirror 2804 and the blue reflective dichroic mirror 2805, and reaches the projection lens 2714 (projection optical system). The intensity-modulated green light is reflected by the green reflective dichroic mirror 2804, and then transmitted through the blue reflective dichroic mirror 2805 before it reaches the projection lens 2714. The intensity-modulated blue light is reflected by the reflection mirror 2806 and the blue reflective dichroic mirror 2805 before it reaches the projection lens 2714.

In this way, also in the projection type display device 9 in which the color light synthesis means is formed by a mirror optical system comprising dichroic mirrors, a liquid crystal light valve of the type which modulates a single kind of polarized light is used, so that, when random polarized light is led to the liquid crystal light valve by using a conventional illuminating device, half the random polarized light is absorbed by the polarizing plate and turned into heat. Thus, in the conventional illuminating device, the efficiency in the utilization of light is rather low, and it is necessary to provide a large and noisy cooling device for restraining the heat generation of the polarizing plate. In the projection type display device 9 of this embodiment, this problem is substantially eliminated.

That is, in the projection type display device 9 of this embodiment, in the polarization illuminating device 1, the polarizing surface rotating action is given by the λ/2 phase difference plate 1043 to one polarized light (for example, P-polarized light) only, and the plane of polarization is aligned with that of the other polarized light (for example, S-polarized light). Thus, polarized lights whose directions of polarization are aligned are led to the first through third liquid crystal light valves 2703, 2705 and 2711, whereby an improvement is achieved in terms of the efficiency in the utilization of light and a bright projection image can be obtained. Further, since the quantity of light absorbed by the polarizing plate is reduced, the temperature rise in the polarizing plate is restrained. Thus, it is possible to realize a reduction in the size and noise of the cooling device. Further, since there are provided two light source sections, the first and second light source sections 101x and 101z, and the direction of polarization of the light emitted from either light source section is aligned without involving any loss, it is possible to obtain a bright projection image. Further, in the polarization illuminating device 1, a thermally stable dielectric multilayer film is used as the polarization separation layer, so that the polarization separation performance of the polarization separation section 202 is thermally stable. Thus, even in the projection type display device 9, of which a large light output is required, a stable polarization separation performance is always available.

Further, as described above, in the projection type display device 9 of this embodiment also, it is possible to make one of the first and second light source sections 101x and 101z detachable, to use two kinds of light source lamps whose emission spectra are different, and to enable the two light source lamps to be selectively lighted, whereby the same effects as described above can be obtained.

It goes without saying that, instead of the polarization illuminating device 1, it is also possible to use the polarization illuminating devices 2 through 8.

[Other Embodiments]

While in the above embodiments P-polarized light is converted to S-polarized light, it is also possible to convert S-polarized light to P-polarized light. In this case, the phase difference layer 1044 of the λ/2 phase difference plate 1043 is arranged at the position where the secondary light source image due to S-polarized light is formed. Further, by imparting polarizing surface rotating action to both P-polarized light and S-polarized light, the polarizing surfaces may be aligned. In this case, the phase difference layer is arranged at the position where the secondary light source image due to both types of polarized light is formed.

Further, in the above embodiments, the λ/2 phase difference plate and the λ/4 phase difference plate are ones formed of an ordinary high molecular film. However, these phase difference plates may also be formed by using twisted nematic liquid crystal (TN liquid crystal). When TN liquid crystal is used, the wavelength dependence of the phase difference plates can be reduced, so that, as compared with the case in which an ordinary high molecular film is used, the polarization conversion performance of the λ/2 phase difference plate and the λ/4 phase difference plate can be improved.

[Advantages]

In the polarization illuminating device of the present invention, random polarized light emitted from first and second light source sections is direction-separated into two kinds of polarized light in a polarization separation section, and then the polarized lights are led to a predetermined region, with the directions of polarization being aligned. Thus, the random polarized light emitted from the first and second light source sections is substantially adjusted into P-polarized light or S-polarized light, and can be applied to the illumination region in a synthesized state, whereby a bright illumination can be effected. Further, although two light source sections are used, the area illuminated corresponds to an illumination area corresponding to a single light source. Thus, as compared to the case in which a single light source is used, the quantity of light per fixed area can be doubled, whereby a bright illumination can be effected.

Industrial Applicability

The optical element of the present invention can be adopted in a polarization illuminating device. Further, the polarization illuminating device of the present invention is suitable for use as the light source of a device using a specific polarized light, such as a projection type display device.

I claim:

1. A polarization illuminating device, comprising:

a polarization separation/synthesis optical element having two polarization separation layers, a first surface side, a second surface side, a third surface side, a fourth surface side, a fifth surface side and a sixth surface side;

a first light source section and a second light source section disposed at the first surface side and the second surface side, respectively of said polarization separation/synthesis optical element;

a first converging reflection optical element disposed at the third surface side of said polarization separation/synthesis optical element and having a plurality of converging reflection elements each adapted to substantially reverse a traveling direction of incident light and form a converging image;

a second converging reflection optical element disposed at the fourth surface side of said polarization separation/synthesis optical element and having a plurality of converging reflection elements each adapted to substantially reverse a traveling direction of incident light and form a converging image;

a third converging reflection optical element disposed at the fifth surface side of said polarization separation/synthesis optical element and having a plurality of converging reflection elements each adapted to substantially reverse a traveling direction of incident light and form a converging image;

a first λ/4 phase difference plate disposed between the third surface side of said polarization separation/synthesis optical element and said first converging reflection optical element;

a second λ/4 phase difference plate disposed between the fourth surface side of said polarization separation/synthesis optical element and said second converging reflection optical element;

a third λ/4 phase difference plate disposed between the fifth surface side of said polarization separation/synthesis optical element and said third converging reflection optical element; and a polarization conversion optical element disposed at the sixth surface side of said polarization separation/synthesis optical element and adapted to align directions of polarization of light emitted from said polarization separation/synthesis optical element.

2. The polarization illuminating device according to claim 1, said first converging reflection optical element being disposed so as not to be orthogonal to an axis orthogonal to the third surface side of said polarization separation/synthesis optical element, said second converging reflection optical element being disposed so as not to be orthogonal to an axis orthogonal to the fourth surface side of said polarization separation/synthesis optical element, and said third converging reflection optical element being disposed so as not to be orthogonal to an axis orthogonal to the fifth surface side of said polarization separation/synthesis optical element.

3. The polarization illuminating device according to claim 1, further comprising an angle variation prism provided at one of multiple positions including: a position between said first converging reflection optical element and the third surface side of said polarization separation/synthesis optical element, a position between said second converging reflection optical element and the fourth surface side of said polarization separation/synthesis optical element, and a position between said third converging reflection optical element and the fifth surface side of said polarization separation/synthesis optical element.

4. The polarization illuminating device according to claim 1, further comprising an optical path changing optical element for changing a traveling direction of light emitted from said polarization conversion optical element.

5. The polarization illuminating device according to claim 1, wherein said converging reflection elements of each of the first converging reflection optical element, the second converging reflection optical element and the third converging reflection optical element include curved-surface mirrors.

6. The polarization illuminating device according to claim 1, wherein each of the first converging reflection optical element, the second converging reflection optical element and the third converging reflection optical element include lenses and reflection surfaces provided on surfaces of said lenses which are opposite to the polarization separation/synthesis optical element.

7. A projection type display device comprising:
a polarization illuminating device as claimed in claim 1;
an optical modulator for modulating light emitted from said polarization illuminating device to form an image; and
a projection optical system for projecting the image formed by said optical modulator.

8. A projection type display device, comprising:
a polarization illuminating device as claimed in claim 1;
a color light separation optical element for separating light emitted from said polarization illuminating device into a plurality of color lights;
a plurality of optical modulators for modulating the color lights separated by said color light separation optical element to form images;
a color light synthesis optical element for synthesizing the images formed by said plurality of optical modulators; and
a projection optical system for projecting the image synthesized by said color light synthesis optical element.

9. The projection type display device according to claim 7, wherein at least one of said first light source section and said second light source section is detachable.

10. The projection type display device according to claim 7, wherein at least one of said first light source section and said second light source selection is selectively lighted.

11. The projection type display device according to claim 8, wherein at least one of said first light source section and said second light source section is detachable.

12. The projection type display device according to claim 8, wherein at least one of said first light source section and said second light source section is selectively lighted.

* * * * *